(12) United States Patent
Kanamori et al.

(10) Patent No.: US 6,335,061 B1
(45) Date of Patent: Jan. 1, 2002

(54) METHOD OF MAKING COATING LAYERS CONTAINING PHOTOCATALYST AND A PHOTOCATALYST COATING FILM FORMED THEREBY

(75) Inventors: Tarou Kanamori; Mibuko Shimada, both of Mie-ken; Toshinori Sakagami, Kanagawa-ken, all of (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 09/487,307

(22) Filed: Jan. 19, 2000

(30) Foreign Application Priority Data

Jan. 19, 1999 (JP) .............................. 11-011121
May 21, 1999 (JP) .............................. 11-142409

(51) Int. Cl.[7] .............................. B05D 3/06; B05D 1/36
(52) U.S. Cl. ..................... 427/515; 427/517; 427/387; 427/412.1
(58) Field of Search .............................. 427/387, 412.1, 427/517, 515

(56) References Cited

U.S. PATENT DOCUMENTS 4,681,808 A * 7/1987 Lefler, III ................ 427/412.1
5,853,866 A * 12/1998 Watanabe et al. ........ 427/312.8
5,905,109 A    5/1999 Shimizu et al. ............. 524/506

FOREIGN PATENT DOCUMENTS

| JP | 9-057912 | | 3/1997 |
| WO | WO95/15816 | * | 6/1995 |
| WO | WO 96/29375 | | 9/1996 |

* cited by examiner

Primary Examiner—Erma Cameron
(74) Attorney, Agent, or Firm—Oblon, Spivak, McClelland, Maier & Neustadt, P.C.

(57) ABSTRACT

A film which is improved in the resistance to fouling, the durability, and the transparency and has a photocatalytic function is provided by a method of making photocatalyst contained coating layers which comprises the steps of forming on the surface of an organic film an (under)coating of a coating composition composed mainly of at least one component (a) selected from organosilanes, hydrolyzates of the organosilanes, and condensates of the organosilanes and, when desired, a polymer component (b) having a silyl group containing silicon atoms bonded with a hydrolytic group and/or a hydroxy group, and forming on the (under)coating an (over)coating of a coating composition composed mainly of the component (a), a photocatalyst and, if desired, the component (b).

14 Claims, No Drawings

US 6,335,061 B1

METHOD OF MAKING COATING LAYERS CONTAINING PHOTOCATALYST AND A PHOTOCATALYST COATING FILM FORMED THEREBY

Method of making coating layers containing photocatalyst and a photocatalyst coating film formed thereby

FIELD OF THE INVENTION

The present invention relates to a method of making photocatalyst contained coating layers to provide a film which is improved in the resistance to fouling, the durability, and the transparency while having a photocatalytic function, and to a photocatalyst coating film formed by the method.

BACKGROUND OF THE INVENTION

It has lately been desired to provide a coating composition for forming a coating which is improved in the resistance to climate, the resistance to fouling, and the resistance to chemicals while being high in the physical hardness. It is also anticipated that such compositions should be arranged favorable for common use. Some conventional compositions composed mainly of a silyl-based vinyl resin and an organosilane compound are disclosed in Japanese Patent Laid-open Publications (Hei)01-69673 and (Hei)01-69674 where fundamental materials for making coatings are limited. Also, similar inventions are disclosed in Japanese Patent Laid-open Publications (Hei)04-108172 and (Hei)04-117473 where fundamental materials are widely selected but their details for coating performances are not definitely described.

Organosilane coating materials have technically been developed for use as maintenance-free coating materials which are advantageous for the resistance to climate (and sunlight), fouling, and so forth. The demand for improving the performance of organosilane coating materials is overwhelmingly increased. Therefore, it is now desired to provide coating materials which are improved in the coating appearance, the adhesivity, the resistance to climate, heat, alkalis, organic chemicals, moisture, and (hot) water, the insulating property, the abrasion resistance, the resistance to fouling, and so forth and are thus capable of forming a coating of a higher hardness.

Particularly for improving the resistance to fouling, it is known to make the surface of a coating hydrophilic. For example, the addition of a hydrophilic material or a water-soluble material is proposed. However, such a hydrophilic material or a water-soluble material may gradually be deteriorated when exposed to light and washed away with water, hence failing to maintain the level of hydrophilic property of the coating at the surface throughout a duration of service time.

Also, a variety of coating components including photocatalytic materials have been provided. One of them is, for example, a component for making a photocatalytic titan oxide coating composed mainly of titan oxide, hydrolyzate of a hydrolytic silicon compound (alkyl silicate or silicon halogenide), and a solvent (water or alcohol) (See Japanese Patent Laid-open Publication (Hei)8-164334). Another is a component treated at the surface for providing anti-bacteria and anti-mycotic properties and comprising a silicon compound having at least two alkoxy groups, a titan or zirconium compound having at least two alkoxy groups, and a hydrophilic non-organic powder e.g. of titan oxide processed with alkoxysilane and/or polysiloxane having at least two alkoxy groups (See Japanese Patent Laid-open Publication (Hei) 8-176527). Moreover, a method is known for making a non-organic coating by producing a coating from a liquid mixture of a powder having a photocatalytic function and containing a non-organic paint which is prepared from 20 to 200 parts by weight of tetra-alkoxysilane, 100 parts by weight of tri-alkoxysilane, and from 0 to 60 parts by weight of dialkoxysilane and of which the weight-average molecular weight based on polystyrene is higher than 900 and processing the coating with an acid or an alkali (See Japanese Patent Laid-open Publication (Hei)8-259891).

However, the compositions for making a coating and the liquid mixture are intended only to provide anti-bacterial and anti-mycotic properties, remove odors, and decompose toxic substances in the alkoxysilane and/or polysiloxane containing a photocatalyst and a guanidyl group. In addition to the above, the above mentioned arts fail to specify totally the essential characteristics of the resultant organosilane coating including the hardness, the adhesivity, and the resistance to alkalis, organic chemicals, climate, and fouling.

Further disclosed are a composition adapted for use as a cog composition which satisfies the requirements for performance of an organosilane coating material and composed mainly of a partial condensate of organosilane, an aqueous dispersion of colloidal silica, and a silicon-modified acrylic resin (See Japanese Patent Laid-open Publication (Sho)60-135465), a composition composed mainly of a condensate of organosilane, a chelate compound of zirconium alkoxide, and a hydrolytic silyl-based vinyl resin (Japanese Patent Laid-open Publication (Sho)64-1769), and a compound composed mainly of a condensate of organosilane, a colloidal alumina, and a hydrolytic silyl-based vinyl resin (See U.S. Pat. No. 4,904,721).

However, coatings made of the compositions disclosed in (Sho)60-135465 and U.S. Pat. No. 4,904,721 have the disadvantage that their glittering property may be declined when they are exposed to ultraviolet light for a considerable length of time. Also, the composition disclosed in (Sho) 64-1769 is low in the storage stability; it may easily be turned to gel within a short period of time when its solid density is increased.

We, the inventors, have invented a composition for coating which includes a hydrolyzate and/or a partial condensate of organosilane, a vinyl resin having a silyl group containing silicon atoms bonded with a hydroxy group and/or a hydrolyzate, a metallic chelate compound, βdiketone and/or β-ketoester (See Japanese Patent Laid-open Publication (Hei)5-345877). While our composition has a favorable balance over the coating characteristics required for any organosilane coating material, more improvement of the coating characteristics shall be required.

Moreover, a self-cleaning film having a surface layer provided on a film substrate and containing substantially transparent particles of a photocatalytic oxide is disclosed in Japanese Patent Laid-open Publication (Hei)9-227161. The film may however be deteriorated by the effect of photocatalytic actions as being doubtful in the long-term durability. Also, a photocatalytic sheet having a photocatalytic coating formed on its upper surface and provided at its lower surface with an adhesive coating for attaching to another device or material to offer a photocatalytic function is disclosed in Japanese Patent Laid-open Publication (Hei)9-313887. Similarly, the sheet may however be deteriorated by the effect of photocatalytic actions as being doubtful in the long-term durability.

SUMMARY OF THE INVENTION

The present invention has been invented in view of overcoming the foregoing technical drawbacks of the prior arts and its object is to provide a method of making photocatalyst contained coating layers to provide a film which is improved in the resistance to fouling, the durability, and the transparency and has a photocatalytic function while the coating is easily applied on an organic film substrate, and provide a photocatalyst coating film produced by the method.

The method of making photocatalyst contained coating layers, according to the present invention, comprises the steps of providing a coating layer of the composition (i) or (ii) on the surface of an organic film and providing a coating layer of the composition (I) or (II) on the coating layer, wherein:

the composition (i) is a coating composition containing at least one component (a) selected from organosilanes, hydrolyzates of the organosilanes, and condensates of the organosilanes represented by Formula 1

$$(R^1)_n Si(OR^2)_{4-n} \quad (1)$$

(wherein, $R^1$ is a monovalent organic group having 1 to 8 carbon atoms: when two exist, they are either identical to or different from each other; $R^2$ is an alkyl group having 1 to 5 carbon atoms or an acyl group having 1 to 6 carbon atoms: when two exist, they are either identical to or different from each other; and n is an integer ranging from 0 to 2);

the composition (ii) is a coating composition containing the component (a) and a polymer component (b) having a silyl group having silicon atoms bonded with a hydrolytic group and/or a hydroxy group;

the composition (I) is a coating composition containing the component (a) and a photocatalyst (c); and the composition (II) is a coating composition containing the component (a), the component (b), and the photocatalyst (c).

The component (b) in the composition (ii) may be at least a substance selected from polymers having a structural unit expressed by Formula 2

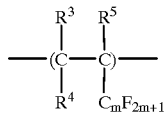

(2)

(wherein, $R^3$ to $R^5$ are $C_m Y_{2m+1}$, m is an integer ranging from 0 to 5, and Y is selected from F, H, and Cl separately) and/or a structural unit expressed by Formula 3

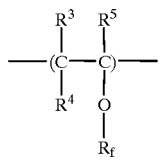

(3)

(wherein, $R_f$ is an alkyl group or an alkoxyalykyl group having fluorine atoms and $R^3$ to $R^5$ are analogous to those in Formula 2 or may be modified without departing from the term of analogy), and simultaneously having a silyl group having silicon atoms bonded with a hydrolytic group and/or a hydroxy group.

The component (b) in the composition (II) may be at least a substance selected from polymers having a structural unit expressed by Formula 2 and/or a structural unit expressed by Formula 3 and simultaneously having a silyl group containing silicon atoms bonded with a hydrolytic group and/or a hydroxy group.

The composition (i) or (ii) may further contain an ultraviolet light absorber (d).

The composition (I) or (II) may further contain a colloidal silica and/or a colloidal alumina (e).

The composition (i) or (ii) may further contain a colloidal silica and/or a colloidal alumina (e).

The component (a) in at least one of the compositions (i), (ii), (I), and (II) may partially or at its entirety have an SiO bond and a siloxane oligomer of which the weight average molecular weight ranges from 300 to 100,000.

Also, at least one of the compositions (i), (ii), (I), and (II) may preferably have a curing catalyst (f).

The curing catalyst (f) may preferably be an organic metal compound.

At least one of the compositions (i), (ii), (I), and (II) may preferably contain at least a compound selected from: β-diketones and β-ketoesters (g) expressed by Formula 4

$$R^6 COCH_2 COR^7 \quad (4)$$

(wherein, $R^6$ is a monovalent hydrocarbon group having 1 to 6 carbon atoms, such as methyl, ethyl, n-propyl, i-propyl, n-butyl, sec-butyl, t-butyl, n-pentyl, n-hexyl, cyclohexyl, or phenyl, and $R^7$ is either a monovalent hydrocarbon group having 1 to 6 carbon atoms, like $R^6$, or an alkoxy group having 1 to 16 carbon atoms, such as methoxy, ethoxy, n-propoxy, i-propoxy, n-butoxy, sec-butoxy, t-butoxy, lauryloxy, or stearyloxy).

The photocatalyst coating film according to the present invention is produced by providing coating layers on the surface of an organic film with the use of a method of making photocatalyst contained coating layers defined above.

DETAILED DESCRIPTION OF THE PREFERRED EMBODIMENTS

The present invention will now be described in a sequence.

Composition (I)

The composition (I) is a coating composition containing the following components (a) and (c).

Component (a)

The component (a) is at least a substance selected from organosilanes denoted by Formula 1 (referred to as organosilanes (1) hereinafter), hydrolyzates of the organosilanes (1), and condensates of the organosilanes (1), which acts as a bonding agent in the composition according to the present invention. More specifically, the component (a) may be of one of the three groups or a mixture of any two groups or a mixture of all the three groups.

Be noted that the hydrolyzate of an organosilane (1) is not limited to a particular one where all the $OR^2$ groups, generally two to four, in the organosilane (1) have been hydrolyzated but may be prepared where one or two or more of the groups have been hydrolyzated or may be a mixture of those groups.

The condensate of an organosilane (1) has an Si—O—Si bond where the silanol group in a hydrolyzate of the organosilane (1) was condensed. It is not mandatory to condense all the silanol groups. The concept of a condensate of the organosilane (1) according to the present invention includes one where only a few of the silanol groups have been condensed and a mixture of condensates whose levels of condensation are different.

In Formula 1, characteristic examples of the monovalent organic group of $R^1$ containing 1 to 8 carbon atoms are, for example, an alkyl group such as methyl, n-propyl, i-propyl, n-butyl, i-butyl, sec-butyl, t-butyl, n-hexyl, n-heptyl, n-octyl, or 2-etylhexyl; an acyl group such as acetyl, propionyl, butyryl, valeryl, benzoyl, trioyl, or caproyl; a vinyl group; an aryl group; a cyclohexyl group; a phenyl group; an epoxy group; a glycidyl group; a (meth-)acryloxy group; an ureide group; an amide group; a fluoroacetoamide group; and an isocyanate group as well as their substituent derivatives.

The substituent group in the substituent derivative of $R^1$ may be selected of a set of halogen atoms, a substituted or not-substituted amino group, a hydroxy group, a mercapto group, an isocyanate group, a glycidoxy group, a 3,4-epoxycyclohexyl group, a (meth-)acryloxy group, an ureide group, and an ammonium base. The number of carbon atoms in the substituent derivative of $R^1$ including the carbon atoms in the substituent group is not greater than eight.

When two R1 groups exist in Formula 1, they may be either identical or different.

The alkyl group of $R^2$ containing 1 to 5 carbon atoms may be, for example, methyl, ethyl, n-propyl, i-propyl, n-butyl, i-butyl, sec-butyl, t-butyl, and n-pentyl. The acyl group may be, for example, acetyl, propionyl, butyryl, valeryl, and caproyl.

Two or more of the $R^2$ groups in Formula 1 may be either identical or different from each other.

Characteristic examples of the organosilane (1) are tetraalkoxysilanes including tetramethoxysilane, tetraethoxysilane, tetra-n-propoxysilane, tetra-i-propoxysilane, and tetra-n-butoxysilane; trialkoxysilane including methyl-trimethoxysilane, methyl triethoxysilane, ethyl-trimethoxysilane, n-propyl-trimethoxysilane, n-propyl-triethoxysilane, i-propyl-triethoxysilane, i-propyl-trimethoxysilane, i-propyl-triethoxysilane, n-butyl-trimethoxysilane, n-butyl-triethoxysilane, n-pentyl-trimethoxysilane, n-hexyl-trimethoxysilane, n-heptyl-trimethoxysilane, n-ctyl-trimethoxysilane, vinyl-trimethoxysilane, vinyl-triethoxysilane, cyclohexyl-trimethoxysilane, cyclohexyl-triethoxysilane, phenyl-trimethoxysilane, phenyl-triethoxysilane, 3-chloropropyl-trimethoxysilane, 3-chloropropyl-triethoxysilane, 3,3,3-trifluoropropyl-trimethoxysilane, 3,3,3-trifluoropropyl-triethoxysilane, 3-aminopropyl-trimethoxysilane, 3-aminopropyl-triethoxysilane, 2-hydroxyethyl-trimethoxysilane, 2-hydroxyethyl-triethoxysilane, 2-hydroxypropyl-trimethoxysilane, 2-hydroxypropyletriethoxysilane, 3-hydroxypropyl-trimethoxysilane, 3-hydroxypropyl-triethoxysilane, 3-mercaptopropyl-trimethoxysilane, 3-mercaptopropyl-triethoxysilane, 3-isocianatepropyl-trimethoxysilane, 3-isocianatepropyl-triethoxysilan, 3-glycidoxypropyl-trimethoxysilane, 3-glycidoxypropyl-triethoxysilane, 2-(3,4-epoxycyclohexyl)ethyl-trimethoxysilane, 2-(3,4-epoxycyclohexyl)ethyl-triethoxysilane, 3-(meth)acryloxypropyl-trimethoxysilane, 3-(meth)acryloxypropyl-triethoxysilane, 3-ureidepropyl-trimethoxysilane, and 3-ureidepropyl-triethoxysilane; dialkoxysilanes including dimethyl-dimethoxysilane, dimethyl-diethoxysilane, diethyl-dimethoxysilane, diethyl-diethoxysilane, di-n-propyl-dimethoxysilane, di-n-propyl-diethoxysilane, di-i-propyl-dimethoxysilane, di-i-propyl-diethoxysilane, di-n-butyl-dimethoxysilane, di-n-butyl-diethoxysilane, di-n-pentyl-dimethoxysilane, di-n-pentyl-ethoxysilane, di-n-hexyl-dimethoxysilane, di-n-hexyl-diethoxysilane, di-n-peptyl-dim ethoxysilane, di-n-peptyl-diethoxysilane, di-n-octyl-dimethoxysilane, di-n-octyl-diethoxysilane, di-n-cyclohexyl-dimethoxysilane, di-n-chclohexyl-diethoxysilane, diphenyl-dimethoxysilane, and diphenyl-diethoxysilane; metyl-triacetyloxysilanes; and dimethyl-diacetyloxysilans.

Preferably, it may be selected from the trialkoxysilanes and the dialkoxysilanes. The trialkoxysilane may preferably be methyl-trimethoxysilane, metyl-triethoxysilane, 3-glycidoxypropyl-dimethoxysilane, 3-glycidoxypropyl-triethoxysilane, 3-(meth)acryloxypropyl-trimethoxysilane, or 3-(meta)acryloxypropyl-triethoxysilane. The dialkoxysilan may preferably be dimethyl-dimethoxysilane or dimethyl-diethoxysilane.

According to the present invention, the organosilane (1) may most preferably be trialkoxysilane or a combination of 40 to 95 mol % of trialkoxysilane and 60 to 5 mol % of dialkoxysilane. The use of dialkoxysilane with trialkoxysilane causes the resultant coating layer to be softened and increased in the resistance to alkalis.

The organosilane (1) may directly be used as a hydrolyzate and/or a condensate. The organosilane (1) employed as the hydrolyzate and/or the condensate enables to be utilized as the component (a) when it has been hydrolyzated and condensed. It is more preferable to perform the hydrolytic and condensing action of the organosilane (1) to yield the component (a) by feeding a proper amount of water during the preparation of the composition as a mixture of the organosilane (1) and the other components, as will explicitly be explained later.

According to the present invention, the component (a) may be provided as a single substance or a mixture of two or more substances.

The component (a) may either partially or totally include a siloxane oligomer which has SiO bonds and of which the weight-average molecular weight ranges from 300 to 100,000.

The siloxane oligomer may be provided as a single oligomer or a mixture of two or more oligomers. The ratio of O to Si in the SiO bond is normally from 0.5:1 to 2:1. The oligomer as a single substance may have a ratio of 1:1 (a 2-functional oligomer), 1.5:1 (a 3-functional oligomer), and 2:1 (a 4-functional oligomer). Most preferable is a siloxane oligomer in which the ratio of O to Si is 1.5:1 or 1:1. The method of producing the siloxane oligomer is of no limitations but may preferably be a process for condensation of the chlorosilane or alkoxysilane.

The end functional group of siloxane in the siloxane oligomer may be selected from a hydroxy group, a set of halogen atoms, an organic group having 1 to 15 carbon atoms (for example, alkyl, acyl, alkoxy, alkoxysilyl, vinyl, aryl, acetoxyl, acetoxysilyl, cycloalkyl, phenyl, glycidyl, (meth)acryloxy, ureide, amide, fluoroacetoamide, or isocyanate), and a group expressed by $Si-(RO)_p-(R'O)_q-R''$ (wherein, R and R' are alkyl groups which are identical or difference, each having 1 to 5 carbon atoms, R" is an alkyl radical having 1 to 5 carbon atoms or hydrogen atoms, and p and q are integers whereas p+q ranges from 2 to 30). Also, the groups may have been hydrolyzated and condensed partially or totally or may be substituent derivatives.

The set of halogen atoms may associate with fluorine and chlorine atoms.

The alkyl group having 1 to 15 carbon atoms may be selected from methyl, ethyl, n-propyl, i-propyl, n-butyl, i-butyl, sec-butyl, t-butyl, n-hexyl, n-heptyl, n-octyl, n-nonyl, n-decyl, undecyl, dodecyl, tridecyl, tetradecyl, hexadecyl, heptadecyl, octadecyl, and 2-ethylhexyl. The acyl group may be selected from acetyl, propionyl, butyryl, valeryl, benzoyl, and trioyl. The alkoxy group may be selected from methoxy, ethoxy, propoxy, and butoxy. The alkoxysilyl group may be selected from methoxysilyl, ethoxysilyl, propoxysilyl, and butoxysilyl. Also, vinyl, aryl, acetoxy, acetoxysilyl, cyclohexyl, phenyl, glycidyl, (meth) acryloxy, ureide, amide, fluoroacetoamide, isocyanate, and their substituent derivatives may equally be used.

The group of $Si—(RO)_p—(R'O)_q—R"$ is a polyoxyalkylene group such as polyoxyethylene, polyoxypropylene, and poly(oxyethylene/oxypropylene). Because the siloxane oligomer has such end functional groups, a co-condensate of the component (a) and the siloxane oligomer is hydrophilic and simultaneously, the polyoxyalkylene groups is very likely to be absorbed by the other components (c) and (d) which in turn improve the dispersion stability.

The substituent group in the substituent derivative may be a set of halogen atoms, a substituted or not-substituted amino group, a hydroxy group, a mercapto group, an isocyanate group, glycidoxy group, a 3,4-epoxycyclohexyl group, a (meth)acryloxy group, an ureide group, an ammonium base, or a ketoester group.

The weight-average molecular weight of the siloxane oligomer ranges from 300 to 100,000, preferably from 600 to 100,000, more preferably from 800 to 100,000, and most preferably from 1,000 to 50,000. If the level is smaller than 300, the resiliency of the resultant coating layer will decrease. If greater than 100,000, the composition in the coating layer will unfortunately be declined in the storage stability.

According to the present invention, the siloxane oligomer may be a mixture of two oligomers whose Mw levels are different from each other. For example, one oligomer has Mw=400 to 2,800 while the other has Mw=3,000 to 50,000.

The amount of the component (a) based on the total amount of a structural unit denoted by $(R^1)_n SiO_{(4-n)/2}$ according to the present invention is preferably from 5 to 95 percent by weight and more preferably from 10 to 90 percent by weight; the same of the siloxane oligomer is preferably from 5 to 95 percent by weight and more preferably from 10 to 90 percent by weight (provided that (a)+siloxane oligomer=100 percent by weight). When the component (a) is smaller than 5 percent by weight, the composition in the resultant coating layer will be poor in the curing property. When higher than 95 percent by weight, the resistance to cracking will be declined.

The siloxane oligomer in the composition of the present invention is normally hydrolyzated and condensed together with the component (a).

In that case, the requirement of water for hydrolysis and condensation of the organosilane (1) and the siloxane oligomer is generally 0.3 to 3 moles and preferably 0.4 to 2 moles, based on one mole of the alkoxy groups.

The hydrolysis and condensation or the reaction during the synthesis of the composition of the present invention is carried out at a temperature of 30 to 80° C., preferably 40 to 70° C., and for a duration of 0.5 to 10 hours, preferably 1 to 7 hours.

In the composition of the present invention, the weight-average molecular weight of a co-hydrolyzated condensate (a hydrolyzate and/or a condensate) of the component (a) and the siloxane oligomer is generally 500 to 100,000 and preferably about 600 to about 80,000.

The component (a) (which may contain a siloxane oligomer) is commercially available as MKC silicate manufactured by Mitsubishi Chemical, an ethyl silicate manufactured by Colcoat, a silicon resin manufactured by Toray/ Dow-Corning, a silicon resin manufactured by Toshiba Silicon, a silicon resin manufactured by Shin-etsu Chemical Industries, a hydroxyl contained polydimethylsiloxane manufactured by Dow-Corning Asia, and a silicon oligomer manufactured by Nippon Unica. In the present invention, those products may be used directly or after subjected to the condensation.

Component (c)

The component (c) is a photocatalyst which is preferably a powder and/or a sol form of a semiconductor having a photocatalytic function.

Characteristic examples of the semiconductor having a photocatalytic function are $TiO_2$, $TiO_3$, $SrTiO_3$, $FeTiO_3$, $WO_3$, $SnO_2$, $Bi_2O_3$, $In_2O_3$, ZnO, $Fe_2O_3$, $RuO_2$, CdO, CdS, CdSe, GaP, GaAs, $CdFeO_3$, $MoS_2$, $LaRhO_3$, GaN, CdP, ZnS, ZnSe, ZnTe, $Nb_2O_5$, $ZrO_2$, InP, GaAsP, InGaAlP, AlGaAs, PbS, InAs, PbSe, and InSb. Preferably it is $TiO_2$ containing the anatase crystalline structure or ZnO and more preferably $TiO_2$.

It was found according to the present invention that the photocatalytic function of the component (c) caused the surface of the coating layer to turn to hydrophilic within a short time after exposed to lower light, thus significantly improving the resistance to fouling of the coating layer while not substantially impairing the other essential characteristics of the coating layer. Also, the component (c) in the composition (I) of the coating according to the present invention is commonly bonded with the component (a), hence ensuring the hydrophilic property and the resistance to fouling in the coating layer throughout a long period of time.

The semiconductor is desired to be used in the form of powder and/or sol. More particularly, the form is preferably selected from three different types: a powder, an aqueous sol as dispersed in water, and a solvent sol as dispersed in a polar solvent such as isopropyl alcohol or a non-polar solvent such as toluene. The solvent sol may be further diluted with water or the solvent depending on the degree of dispersion of the semiconductor. The smaller the average diameter of particles of the semiconductor in the given state, the better the photocatalytic function is implemented. When the average particle diameter of the semiconductor exceeds 0.3 μm, the shading action of the semiconductor will readily make the coating layer opaque. When smaller than 0.3 μm, the coating layer will remain transparent. Accordingly, the average particle diameter of the semiconductor can desirably be determined corresponding to the application of the composition.

In case that the component (c) is in the form of an aqueous sol or a solvent sol, the solids concentration is preferably not higher than 50 percent by weight and more preferably not higher than 40 percent by weight.

For feeding the component (c) into the composition, it is desired to add the component (c) to a combination of the component (a), the solvent, and any of other components (d) to (h) as desired. Alternatively, after the component (c) is fed during the preparation of the composition, the component (a) is subjected to the hydrolysis and the condensation under the presence of the component (c). The feeding of the component (c) during the preparation of the composition allows a semiconductor constituent in the component (c) to be condensed together with the component (a), whereby the durability of the resultant coating layer will be improved throughout a long period of time. Also, in case that the component (c) is an aqueous sol, it is preferably fed during the preparation of the composition. If the viscosity is high due to the presence of a component (g), which will be explained later, the component (c) may preferably be fed during the preparation of the composition. Moreover, in case that the composition of the present invention is provided as an enamel including colorants, the adjustment for a color may be conducted after the supply of the component (c) or feeding the component (c) and the colorants may be carried out at once.

According to the present invention, the component (c) may be provided as a single substance or a combination of two or more substances.

The amount of the component (c) to be used is generally 1 to 500 parts by weight in its solid state, based on 100 parts by weight of the structural unit $(R^1)_n SiO_{(4-n)/2}$ in the component (a) (wherein, $R^1$ and n conform to those in Formula 1), and preferably 5 to 400 parts by weight. If the amount is smaller than 1 part by weight, the resistance to fouling derived from the photocatalytic action will be declined. When the amount exceeds 500 parts by weight, the forming of the coating layer will be discouraged.

The composition (I) of the present invention consists mainly of the two essential components (a) and (c) and, if desired, may be added with other appropriate components which will be explained later. The composition (I) is commonly provided with its components dissolved or dispersed in a solvent.

For preparing the composition, water is used to carry out the hydrolysis and condensation of the organosilane (1) or disperse the colloidal components which will be explained later. The requirement of water according to the present invention is generally 0.3 to 3 moles and preferably 0.4 to 2 moles, based on one mole of the alkoxy group in the component (a).

According to the present invention, an organic solvent is used to assist uniform mixture of the component (a), the component (c), and the other relevant components to have a desired concentration of all solids in the composition. In addition, the organic solvent may assist each of a variety of coating processes and thus increase the dispersion stability and the storage stability of a resultant coating.

The organic solvent for assisting to mix up the components uniformly is of no limitations and may be selected from, for example, alcohols, aromatic hydrocarbons, ethers, ketones, and esters.

The alcohols for the organic solvent include specifically methanol, ethanol, n-propyl alcohol, i-propyl alcohol, n-butyl alcohol, sec-butyl alcohol, t-butyl alcohol, n-hexyl alcohol, n-octyl alcohol, ethylene glycol, diethylene glycol, triethylene glycol, ethylene glycol monobutyl ether, ethylene glycol monoethyl ether acetate, diethylene glycol monoethyl ether, propylene glycol monomethyl ether, propylene monomethyl ether acetate, and diacetone alcohol.

The aromatic hydrocarbons include specifically benzene, toluene, and xylene. The ethers include specifically tetrahydrofuran and dioxane. The ketones include specifically acetone, methylethyl ketone, methylisobutyl ketone, and di-isobutyl ketone. The esters include specifically ethyl acetate, propyl acetate, butyl acetate, and propylene carobonate.

The organic solvent may be provided as a single solvent or a combination of two or more solvents.

Composition (II)

The composition (II) consists mainly of the two essential components (a) and (c) plus the following component (b).

Component (b)

The component (b) is a polymer (referred to as a silyl based polymer hereinafter) where a silyl group having silicon atoms bonded with a hydrolytic group and/or a hydroxy group (referred to as a specific silyl group hereinafter) is linked to the end and/or side of a molecular chain of the polymer. The component (b) in the composition (II) allows the hydrolytic radical and/or hydroxy radical in its specific silyl group to be condensed together with the component (a) thus contributing to the improvement of the coating layer characteristics.

The amount of silicon in the component (b) is generally 0.001 to 20 percent by weight and preferably 0.01 to 15 percent by weight, based on the total amount of the component (b).

A preferable form of the specific silyl group is expressed by Formula 5:

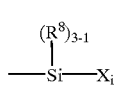

(5)

(wherein, X is a hydrolytic group or hydroxy groups of halogen atoms, an alkoxyl group, an acetoxy group, a phenoxt group, a tioalkoxyl group, or an amino group, R8 is hydrogen atoms, an alkyl group having 1 to 10 carbon atoms, or an aralkyl group having 1 to 10 carbon atoms, and i is an integer ranging from 1 to 3).

The component (b) may be produced by the following manners A and B.

Manner A: A method of adding a hydrosilane compound expressed by Formula 5 (referred to as a hydrosilane compound A hereinafter) to a carbon-carbon double bond in a carbon-carbon double bond containing vinyl polymer (referred to as an unsaturated vinyl polymer hereinafter)

Manner B: A method of co-polymerizing a silane compound (referred to as an unsaturated silane compound B hereinafter) which is expressed by Formula 6:

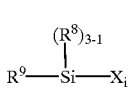

(6)

(wherein, X, $R^8$, and i are identical to those in Formula 5 and $R^9$ is an organic group having a polymeric double bond) with other vinyl monomers.

The hydrosilane compound A used in the manner A may be selected from, for example, halogenated silanes including methyl dichlorosilane, trichlorosilane, and phenyl dichlorosilane; alkoxysilanes including methyl dimethoxysilane, methyl diethoxysilane, phenyl dimethoxysilane, trimethoxysilane, and triethoxysilane; acyloxysilanes including methyl diacetoxysilane, phenyl diacetoxysilane, and triacetoxysilane; and aminoxysilanes including methyl dianinoxysilane, triaminoxysilane, and dimetyl aminoxysilane.

The hydrosilane compound A may be provided as a single compound or a combination of two or more compounds.

The unsaturated vinyl polymer having hydroxy groups and used in the manner A and having is of no limitations and may, for example, be produced by the following manners A1 and A2 and their combination.

Manner A1: A method of (co-)polymerizing vinyl monomers containing a functional group (referred to as a functional group α hereinafter) to yield a (co-)polymer and react the functional group α in the (co-)polymer with the carbon-carbon double bond contained unsaturated compound, which has a functional group (referred to as a functional group β hereinafter) reactable with the functional group α to yield an unsaturated vinyl polymer where the carbon-carbon double bond is linked to a side of the molecular chain of the polymer.

Manner A2: A method of (co-)polymerizing vinyl monomers with the use of either a radical polymerization initiator having the functional group α (for example, 4,4-azobis-4-cyanovalerianic acid) or a compound of a radical polymerization initiator and a chain transfer agent both having the functional group α (for example, 4,4-azobis-4-cyanovalerianic acid and dithioglycol acid) to yield a (co-)polymer where the functional groups α derived from the radical polymerization initiator and the chain transfer agent are linked to one or both ends of a molecular chain of the polymer, and causing the functional groups α in the (co-)polymer to react on the carbon-carbon double bond contained unsaturated compound having the functional group β to yield an unsaturated vinyl polymer where the carbon-carbon double bond is linked to one or both ends of a molecular chain of the polymer.

The reaction between the two functional groups α and β in the two manners A1 and A2 may involve esterification between a carboxyl group and a hydroxy group, ring opening esterification between a carbonic acid anhydrous group and a hydroxy group, ring opening esterification between a carboxyl group and an epoxy group, amidation between a carboxyl group and an amino group, ring opening amidation between a carbonic acid anhydrous group and an amino group, ring opening addition reaction between an epoxy group and an amino group, urethanation between a hydroxy group and an isocyanate group, or their combination.

The vinyl monomer having the functional group α may be selected from unsaturated carboxylic acid anhydrides including (meth) acrylic acid, crotonic acid, maleic acid, fumaric acid, and itaconic acid; hydroxy contained vinyl monomers including 2-hydroxyethyl (meth)acrylate, 2-hydroxypropyl(meth)acrylate, 3-hydroxypropyl-(meth) acrylate, N-methyl(meth)acrylamide, and 2-hydroxyethylvinylether; amino contained vinyl monomers including 2-aminoethyl (meth) acrylate, 2-aminopropyl (meth)acrylate, 3-aminopropyl(meth)acrylate, and 2-aminoethylvinylether; amine-imide contained vinyl monomers including 1,1,1-trimethylamine8meth)acrylimide, 1,1-dmethyl-1-(2-hydroxypropyl) amine(meth) acrylimide, 1,1-dimethyl-1-(2'-phenyl-2'-hydroxyethyl) amine(meth)acrylimide, and 1,1-dimethyl-1-(2'-hydroxy-2'-phenoxypropyl)amine(meth)acrylimide; and epoxy contained vinyl monomers including glycidyl(meth)acrylate and arylglycidylether.

The vinyl monomer having the functional group α may be provided in the form of a single monomer or a combination of two or more monomers.

The vinyl monomer capable of co-polymerizing with the functional group α containing vinyl monomer may be selected from:

(A) aromatic vinyl monomers including styrene, α-methylstyrene, 4-methylstyrene, 2-methylstyrene, 3-methylstyrene, 4-methoxystyrene, 2-hydroxymethylstyrene, 4-ethylstyrene, 4-ethoxystyrene, 3,4-dimethylstyrene, 3,4-diethylstyrene, 2-chlorostyrene, 3-chlorostyrene, 4-chloro-3-methylstyrene, 4-t-butylstyrenen, 2,4-dichlorostyrene, 2,6-dichlorostyrene, and 1-vinylphthalene;

(B) (meth)acrylates including methyl(meth)acrylate, ethyl (meth)acrylate, propyl(meth)acrylate, n-butyl(meth) acrylate, i-butyl(meth)acrylate, amyl(meth)acrylate, i-amyl(meth)acrylate, hexyl(meth)acrylate, 2-ethylhexyl(meth)acrylate, n-octyl(meth)acrylate, and cyclohexyl-methacrylate;

(C) multi-functional monomers including divinylbenzene, ethyleneglycol-di(meth)acrylate, dithyleneglycol-di (meth)acrylate, triethyleneglycol-di(metha)acrylate, tetraethylenegrlycol-di(meth)acrylate, propyleneglycol-di(meth)acrylate, dipropyleneglycol-di(meth)acrylate, tripropyleneglycol-di(meth)acrylate, tetrapropyleneglycol-di(meth)acrylate, butanediol-di (meth)acrylate, hexanediol-di(meth)acrylate, trimehylolpropane-tri(meth)acrylate, and pentaerythritol-tetra(meth)acrylate;

(D) acidic amide compounds including (meth)acrylamide, N-methylol(meth)acrylamide, N-methoxymethyl (meth)acrylamide, N-butoxymethyl(meth)acrylamide, N,N'-methylenebisacrylamide, diacetoneacryleamide, maleic acid amide, and maleimide;

(E) vinyl compounds including vinyl chloride, vinylidene chloride, and fatty vinylester;

(F) aliphatic conjugate dienes including 1,3-butadiene, 2-methyl-1,3-butadinene, 2,3-dimethyl-1,3-butadiene, 2-neopentyl-1,3-butadinene, 2-chloro-1,3-butadiene, 2-cyano-1,3-butadinene, isoprene, substituent straight-chain conjugate pentadiene substituted with a substituent group such as an alkyl group, halogen atoms, or a cyano group, and straight-chain or side-chain conjugate hexadinene;

(G) vinyl cyanide compounds including acrylonitryl and methacrylonitryl;

(H) fluorine atom containing monomers including trifluoroethyl(meth)acrylate and pentadecafluorooctyl (meth)acrylate;

(I) piperidine monomers including 4-(meth)acryloiloxy-2,2,6,6,-tetramethylpiperidine, 4-(meth)acryloilamino-2,2,6,6-tetramethylpiperidine, and 4-(meth) acryloiloxy-1,2,2,6,6-pentamethylpiperidine; and other substances including caprolactam.

This type of the monomers may be provided in the form of a single monomer or a combination of two or more monomers.

The unsaturated compounds having the functional group α and the carbon-carbon double bond may be selected from vinyl monomers including a functional group α containing vinyl monomer, and isocyanate containing unsaturated compounds prepared by causing the hydroxy containing vinyl monomer to react on a di-isocyanate compound in equivalent mole relationship.

Characteristic examples of the unsaturated silane compound B used in the above described manner B are:
$CH_2=CHSi(CH_3)(OCH_3)_2$, $CH_2=CHSi(OCH_3)_3$, $CH_3=CHSi(CH_3)Cl_2$,
$CH_2=CHSiCl_3$, $CH_2=CHCOO(CH_2)_2Si(CH_3)_2(OCH_3)_2$,
$CH_2=CHCOO(CH_2)_2Si(OCH_3)_3$, $CH_2=CHCOO(CH_2)_3Si(CH_3)(OCH_3)_2$;
$CH_2=CHCOO(CH_2)_3Si(OCH_3)_3$, $CH_2=CHCOO(CH_2)_2Si(CH_3)Cl_2$,
$CH_2=CHCOO(CH_2)_2SiCl_3$, $CH_2=CHCOO(CH_2)_3Si(CH_3)Cl_2$,
$CH_2=CHCOO(CH_2)_3SiCl_3$, $CH_2=C(CH_3)COO(CH_2)_2Si(CH_3)(OCH_3)_2$,
$CH_2=C(CH_3)COO(CH_2)_2Si(OCH_3)_3$,
$CH_2=C(CH_3)COO(CH_2)_3Si(CH_3)(OCH_3)_2$,
$CH_2=C(CH_3)COO(CH_2)_3Si(OCH_3)_3$, $CH_2=C(CH_3)COO(CH_2)_2Si(CH_3)Cl_2$,
$CH_2=C(CH_3)COO(CH_2)_2SiCl_3$, $CH_2=C(CH_3)COO(CH_2)_3 Si(CH_3)Cl_2$, and

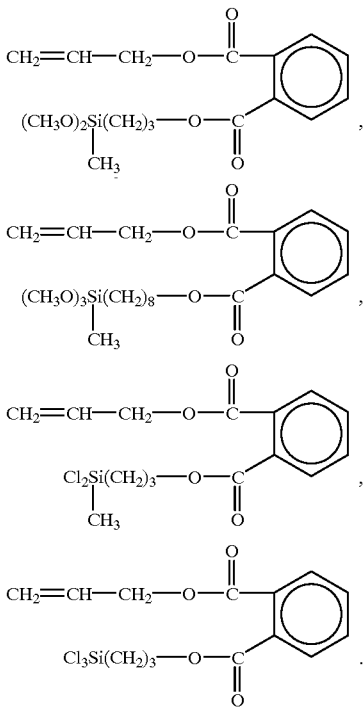

The compound may be provided in the form of a single compound or a combination of two or more compounds.

The vinyl monomer to be co-polymerized with the unsaturated silane compound B may be selected from the vinyl monomers having the functional group α previously described with the manner A1 and other similar vinyl monomers.

Alternatively, the component (b) may be selected from specific silyl contained epoxy resins and specific silyl contained polyester resins.

The specific silyl contained epoxy resin may be produced by causing the epoxy group in an epoxy resin such as bisphenol A type epoxy resin, bisphenol F type epoxy resin, water-added bisphenol A type epoxy resin, aliphatic polyglycidylether, or aliphatic polyglycidylester to react on aminosilane, vinylsilane, carboxysilane, or glycidylsilane having the specific silyl group.

The specific silyl contained polyester resin may be produced by causing the carboxyl group or hydroxy group in a polyester resin to react on aminosilane, carboxysilane, or glycidylsilane having the specific silyl group.

Mw of the component (b) ranges preferably 2,000 to 100,000 and more preferably 4,000 to 50,000.

The amount of the component (b) used in the composition (II) is generally 2 to 900 parts by weight, preferably 10 to 400 parts by weight, and more preferably 20 to 200 parts by weight, based on 100 parts by weight of the structural unit $(R^1)_n SiO_{(4-n)/2}$ in the component (a). In that case, when the component is smaller than 2 parts by weight, its resultant coating layer will be declined in the resistance to alkalis. If higher than 900 parts by weight, the resistance to climate of the coating layer throughout a long period of time will be lowered.

The polymerization of producing the component (b) may be implemented by a process of feeding the monomers at once for polymerization, a process of polymerizing some of the monomers and then continuously or intermittently feeding the remaining monomers, or a process of feeding the monomers in a succession throughout polymerization. Also, any combination of the polymerizing processes may be employed. Most preferable is a technique of solution polymerization. Any common solvent for the solution used in the polymerizing process may be used; a ketone or alcohol solvent is more desirable. For the polymerization, a polymerizing initiator, a molecular weight modifier, a chelating agent, and an inorganic electrolysis may successfully be selected from known agents.

According to the present invention, the component (b) may be provided in the form of a single substance or a combination of two or more substance as described above.

Preferably, the component (b) in the composition (II) may be condensed together with the component (a) under the presence of water or an organic solvent.

The composition (II) of the present invention is composed essentially of the components (a), (b), and (c) and, if desired, may be added with the optional components described later. The organic solvent used for preparing the composition (II) is equally selected from those described previously for the composition (I).

The component (b) in the composition (II) of the present invention may be a silyl based fluorine polymer (b2) which is described below.

Component (b2)

The component (b2) is a fluorine polymer having a structural unit expressed by Formula 2 (referred to as a structural unit b2-1 hereinafter) and/or a structural unit expressed by Formula 3 (referred to as a structural unit b2-2 hereinafter) and arranged in which the specific silyl group is preferably linked to an end and/or a side of its polymer molecular chain.

The component (b2) allows the resultant coating layer made of the composition of the present invention to have improved coating properties because the hydrolytic group and/or the hydroxy group in the specific silyl group is condensed together with the component (a) when the coating layer is being cured.

The amount of silicon atoms in the component (b2) is generally 0.1 to 60 mol % and preferably 0.5 to 50 mol %, based on the total amount of the component (b2).

The component (b2) is preferably synthesized by polymerizing a monomer (referred to as a monomer (b2-1) hereinafter) having the structure unit denoted by Formula 2 and/or a monomer (referred to as a monomer (b2-2) hereinafter) having the structural unit denoted by Formula 3 and a monomer (referred to as a monomer b2-3 hereinafter) having a set of silicon atoms bonded to the hydrolytic group and/or the hydroxy group in the specific silyl group expressed by Formula 6 and may further be added with another monomer (referred to as a monomer (b2-4) hereinafter) which can co-polymerizes with the foregoing monomers. The monomer (b2-4) may contain fluorine atoms which are absent in the other monomers (b2-1) and (b2-2).

The component (b2) may also be a polymer synthesized by polymerizing the monomer (b2-1) and/or the monomer (b2-2); the polymer may be added with the monomer (b2-4), if desired, where its carbon-carbon double bond is linked by reaction to a silane compound (referred to as a silane compound (b2-5) hereinafter) which has a functional group capable of reacting with the hydrolytic group or the hydroxy group.

Monomer (b2-1)

The monomer (b2-1) is expressed by Formula 2',

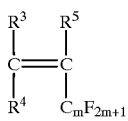

(2')

(wherein, $R^3$ to $R^5$ are $C_mY_{2m+1}$, m is an integer ranging 0 to 5, and Y is selected from F, H, and Cl separately).

The monomer (b2-1) may be a compound having a polymeric unsaturated double bond group and at least one fluorine atom.

More particularly, the monomer (b2-1) may be selected from:

(A) fluoroethylenes including $CF_2=CF_2$, $CHF=CF_2$, $CH_2=CF_2$, $CH_2=CHF$, $CClF=CF_2$, $CHCl=CF_2$, $CCl_2=CF_2$, $CClF=CClF$, $CHF=CCl_2$, $CH_2=CClF$, and $CCl_2=CClF$;

(B) fluoropropenes including $CF_3CF=CF_2$, $CF_3CF=CHF$, $CF_3CH=CF_2$, $CF_3CF=CH_2$, $CF_3CF=CHF$, $CHF_2CF=CHF$, $CF_3CH=CH_2$, $CH_3CF=CF_2$, $CH_3CH=CF_2$, $CF_3CF=CH_2$, $CF_3ClCF=CF_2$, $CF_3CCl=CF_2$, $CF_3CF=CFCl$, $CF_3CLCCl=CCl_2$, $CCl_3CF=CF_2$, $CF_3ClCCl=CCl_2$, $CFCl_2CCl=CHCl$, $CHF_2CCl=CCl_2$, $CF_2ClCH=CCl_2$, $CF_2ClCCl=CHCl$, and $CCl_3CF=CHCl$; and (C) Fluoroolephines having not smaller than four carbon atoms including $CF_3CF_2CF=CF_2$, $CF_3CF=CFCF_3$, $CF_3CH=FCF_3$, $CF_2=CFCF_2CHF_2$, $CF_3CF_2CF=CH_2$, $CF_2CH=CHCF_3$, $CF_2=CFCF_2CH_3$, $CF_2=CFCH_2CH_3$, $CF_3CH_2CH=CH_2$, $CF_3CH=CHCH_3$, $CF_2=CHCH_2CH_3$, $CH_3CF_2CH=CH_2$, $CFH_2CH=CHCFH_2$, $CH_3CF_2CH=CH_2$, $CF_2=CFCH_2CH_3$, $CF_3(CF_2)_2CF=CF_2$, and $CF_3(CF_2)_2 CF=CF_2$.

The monomer (b2-1) having fluorine atoms may be provided in the form of a single monomer or a combination of two or more monomers.

Monomer (b2-2)

The monomer (b2-2) is expressed by Formula 3',

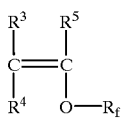

(3')

(wherein, $R_f$ is an alkyl group or an alkoxyalkyl group having fluorine atoms and $R^3$ to $R^5$ are analogous to those of Formula 2' but may be modified without departing from the term of analogy to Formula 2').

The monomer (b2-2) may be a compound having a polymeric unsaturated double bond group, an ether bond, and at least one fluorine atom.

More particularly, the monomer (b2-2) may be selected from:

(A) (fluoroalkyl) vinyl ether or (fluoroalkoxyalyl) vinyl ether expressed by $CH_2=CH-O-R_f$ (wherein, $R_f$ is an alkyl group or an alkoxyalkyl group having fluorine atoms);

(B) perfluoro(alkyl)vinyl ethers including perfluoromethylvinyl ether, perfuoroethylvinyl ether, perfluoropropylvinyl ether, perfluorobutylvinyl ether, and perfluoroisobutylvinyl ether; and (C) perfluoro(alkoxyalkyl)vinyl ethers including perfluoropropoxypropylvinyl ether.

The monomer (b2-2) having fluorine atoms may be provided in the form of a single monomer or a combination of two or more monomers.

When the two monomers (b2-1) and (b2-2) are used in a combination, they may preferably be hexafluoropropylene and perfluoroalkyl-perfuluorovinylether or perfluoroalkoxyalkyl-perfuluorovinylether.

Monomer (b2-3)

The monomer (b2-3) is a monomer having a polymeric unsaturated double bond in one molecule and silicon atoms bonded to a hydrolytic group and/or a hydroxy group.

The monomer (b2-3) may be an unsaturated silane compound B expressed by Formula 6 used for synthesizing the silyl contained polymer (b).

Monomer (b2-4)

The monomer (b2-4) capable of co-polymerizing with the monomers (b2-1) to (b2-3) may be a vinyl monomer having the functional group α used for synthesizing the silyl contained polymer (b).

Silane compound (b2-5)

The silane compound (b2-5) for addition reaction may be selected from halogenated silanes including methydichlorsilane, trichlorsilane, and phenyl-dichlorsilane; alkoxysilanes including methy-diethoxysilane, methyldimethoxysilane, phenyl-dimehoxysilane, trimethoxysilane, and triethoxysilane; acyroxysilanes including metylediacetoxysilane, phenyl-diacetoxysilane, and triacetoxysilane; and aminoxysilanes including metyl-diaminoxysilane, triaminoxysilane, and dimetyl-aminoxysilane. The silane compound (b2-5) may be provided in the form of a single compound or a combination of two or more compounds.

The polymerization for synthesizing the component (b2) may be implemented by a process of polymerizing the monomers at once, a process of polymerizing some of the monomers and feeding the remaining of the monomers continuously or intermittently, or a process of feeding the monomers in a succession. Any combination of the foregoing processes may also be used with equal success. Most preferable is a technique of solution polymerization. The solvent used in the solution polymerization is any commonly available solvent and may preferably be selected from ketones and alcohols. For the polymerization, a polymerizing initiator, a molecular weight modifier, a chelating agent, and an inorganic electrolysis may be known ones.

The amount of a sum of the structural units (b2-1) and (b2-2) in the component (b2) is generally 0.5 to 80 mol % and preferably 1 to 70 mol %, based on the total amount of the component (b2). When the amount is lower than 0.5 mol %, the resultant coating layer may hardly be improved in the transparency and the adhesivity. If higher than 80 mol %, the adhesivity of the coating layer to a substrate may be declined.

The amount of the structural unit (b2-1) is preferably 0.5 to 70 mol %, based on the total amount of the component (b2). The amount of the structural unit (b2-2) is preferably 0.5 to 70 mol %, based on the total amount of the component (b2).

The amount of the structural unit (b2-3) is generally 0.1 to 60 mol % of the specific silyl group and preferably 0.5 to 50 mol %, based on the total amount of the component (b2). When the amount is lower than 0.1 mol %, the effect of condensation together with the component (a) will hardly be ensured. If higher than 60 mol %, the storage stability of the resultant coating composition will be declined.

The amount of the structural unit (b2-4) composed of the monomer (b2-4) capable of co-polymerizing with the other monomers is generally not higher than 90 mol % and preferably not higher than 80 mol %, based on the total amount of the component (b2).

Mw of the component (b2) is preferably 1,000 to 100,000 and more preferably 5,000 to 50,000.

The component (b2) in the composition (II) may be provided in the form of a single substance or a combination of two or more substance as described above.

The amount of the component (b2) in the composition (II) is generally 20 to 500 parts by weight, preferably 25 to 400 parts by weight, and more preferably 50 to 300 parts by weight, based on 100 parts by weight of the structural unit $(R^1)_n SiO_{(4-n)/2}$ in the component (a). When the amount of component (b2) is smaller than 20 parts by weight, the resultant coating layer will be declined in the resistance to alkalis and cracking. If greater than 500 parts by weight, the resistance to climate of the coating layer will be declined.

Preferably for the composition (II), the component (b2) is condensed together with the component (a) under the presence of water and/or an organic solvent.

According to the present invention, another vinyl copolymer having the specific silyl group such as the component (b) may be used in addition to the component (b2) without impairing the effect of the present invention. The amount of the another vinyl copolymer in the composition (II) is generally not greater than 500 parts by weight, based on 100 parts by weight of the structural unit $(R^1)_n SiO_{(4-n)/2}$ in the component (a).

The components (a) and (c) and the organic solvent in the composition (II) are identical in the type and the amount to those in the composition (I) and will be explained in no more detail.

Compositions (i) and (ii)

The composition (i) is similar to the composition (I) while the composition (ii) is similar to the composition (II); the two (i) and (ii) are equivalent to the compositions (I) and (II) respectively less the component (c). The components and the type and amount of an organic solvent in the compositions (i) and (ii) are identical to those in their corresponding compositions (I) and (II) except the component (c) and will be explained in no more detail.

Each of the compositions (i), (ii), (I), and (II) may further be added with the following components (d) to (h) as well as other additives, which will be explained below.

Component (d)

The composition (i) or (ii) may preferably contain the component (d).

The component (d) in the composition of the present invention is an ultraviolet light absorber such as fine particles of a semiconductor capable of absorbing ultraviolet light.

The ultraviolet light absorber may be selected from inorganic semiconductors including $TiO_2$ in rutile crystalline structure (having no photocatalytic function), ZnO, and $CeO_2$; and organic ultraviolet ray absorbers including salicyl acids, benzophenones, benzotriasols, cyanoacrylates, and triadines. Most preferable are ZnO and $CeO_2$.

The ultraviolet light absorbing function of the component (d) in the composition of the present invention allows the resultant coating layer to absorb ultraviolet light without trading off the substantial properties, hence preventing deterioration of the undercoating and of the substrate by ultraviolet light.

The component (d) is provided in three different states: powder of fine particles, aqueous sol where fine particles are dispersed in water, and solvent sol where fine particles are dispersed in a polar solvent such as isopropylalcohol or a non-polar solvent such as toluene. The solvent sol may further be diluted with water or a solvent depending on the degree of dispersion of fine semiconductor particles. The average particle diameter of semiconductor particles in such a state is preferably as small as possible in view of the absorption of ultraviolet light; it is generally not greater than 1 μm, preferably not greater than 0.5 μm, and more preferably not greater than 0.1 μm. Since the component (d) is provided in the form of fine particles, its ultraviolet light absorbing function increases to a level equal to that of an organic ultraviolet light absorber. Also, improvement in the dispersion uniformity results in the higher transparency and the storage stability of the coating. The fine particles or the sol may preferably be added with a surface activator, a dispersing agent, and a coupling agent for conducting further surface treatments.

When the component (d) is in the form of an aqueous sol or a solvent sol, its solid concentration is preferably not higher than 60 percent by weight and more preferably not higher than 50 percent by weight.

The method of combining the component (d) with the composition of the present invention may involve either feeding the component (d) after the supply of the other components or feeding the component (d) during preparation of the composition of the present invention and promoting hydrolysis and partial condensation of the organosilans of the component (a) under the presence of the component (d). Feeding the component (d) during the preparation of the composition allows co-condensation of the semiconductor compounds in the component (d) with the component (a), thus increasing the dispersion property of the component (d). When the component (d) is an aqueous sol, it may preferably be fed during the preparation of the composition. Also, in case that the viscosity in a system is increased by addition of the component (g) described later, the component (d) may preferably be fed during the preparation of the composition.

The component (d) may commercially be available as Taipek TTO of Ishihara Sangyo, ZW-143, ZW-513C, ZS-300, ZS-303, ZnO-100, and ZnO-200 of Sumitomo Osaka Cement, Z-Nouve of Mitsui Metal Mining, Needlal of Tagi Chemical, and Ceriguard and hicera super K29 of Nihon Inorganic Chemistry.

The component (d) in the composition of the present invention may be provided in the form of a single substance or a combination of two or more substance.

The amount of the component (d), based on 100 parts by weight of the structural unit, $(R^1)_n SiO_{(4-n)/2}$, in the component (a) is generally, in solid state, 1 to 150 parts by weight and preferably 5 to 100 parts by weight. When the amount is smaller than 1 part by weight, the ultraviolet light absorbing function will be declined. If greater than 150 parts by weight, the resultant coating layer will be declined in the forming properties, thus suffering from cracking and peeling.

Component (e)

The compositions (I), (II), (i), and (ii) may contain the component (e).

According to the present invention, the component (e) is colloidal silica and/or a colloidal alumina. It may be provided in an aqueous sol or colloid where it is dispersed in water, or a solvent sol or colloid where it is dispersed in a polar solvent such as isopropylalcohol or a non-polar solvent such as toluene. The component (e) in the solvent sol or colloid form may further be diluted with water or the solvent depending on the degree of dispersion in the sol or colloid or may be surface treated for increasing the dispersing properties.

The component (e) of the aqueous sol or colloid, or the solvent sol or colloid form is preferably not higher than 40 percent by weight in the solid concentration.

The average particle diameter in the colloid form is preferably not greater than 1 μm and more preferably not greater than 0.5 μm. When the average diameter exceeds 1 μm, the particles may sink down.

The component (e) in the composition of the present invention contributes to the improvement of the flexibility of the resultant coating layer when cured and the increase of its critical film thickness. Also, the component (e) when used for a composition for overcoating (namely (I) or (II)) permits the use of the component (c) to be minimum without affecting the photocatalytic function, thus improving the resistance to climate of the resultant overcoating. Also, the component (e) when used for a composition for undercoating (namely (i) or (ii)) improves the adhesivity of the overcoating to the undercoating.

The method of combining the component (e) with the composition may involve feeding the component (e) after the preparation of the composition or feeding the same during the preparation of the composition to allows the hydrolysis and condensation of the component (e) together with the other components (a), (b), and (b2) or their condensates.

The colloidal silica form of the component (e) may commercially be available as, for example, Snowtex, Isopropanol Silicagel, and Methanolgel by Nissan Chemical; Cataloid and Oscar by Shokubai Chemical; Ludox by Dupont, U.S.A.; and Nalcoag by Nalco Chemical, U.S.A. The colloidal alumina form of the component (e) may be available as Alminasol-100, Aluminasol-200, and Aluminasol-520 by Nissan Chemical; and Aluminum Oxide C by Dhexa, West Germany.

The component (e) in the composition of the present invention may be provided in the form of a single substance or a combination of two or more substances.

The amount of the component (e) based on 100 parts by weight of the structural unit, $(R^1)_nSiO_{(4-n)/2}$, in the component (a), is generally 0 to 500 parts by weight and preferably 0.1 to 400 parts by weight in solid state.

Component (f)

At least one of the compositions (I), (II), (i), and (ii) preferably contains the component (f) explained below.

The component (f) is a catalyst for encouraging the hydrolysis and condensation of the components (a), (b) and (b2).

The use of the component (f) will accelerate the speed of curing the resultant coating layer and increase the molecular weight of polysiloxane produced by polycondensation of the organosilane component, hence allowing the resultant coating layer to be improved in the physical strength and the long-term durability as well as making the coating layer thickness increased and facilitating the coating application.

The component (f) is preferably selected from acidic compounds, alkali compounds, basic compounds, amine compounds, metalates, and/or their partial hydrolyzates (the metalates and/or their partial hydrolyzates being referred to as organic metallic compounds).

Characteristic examples of the acidic compound are acetic acid, hydrochloric acid, sulfuric acid, phosphoric acid, alkyltitanic acid, p-toluenesulphonic acid, and phthalic acid and it may preferably be acetic acid.

Characteristic examples of the alkali compound are sodium hydroxide and potassium hydroxide and it may preferably be sodium hydroxide.

Characteristic examples of the basic compound are alkali metal salts including naphthenic acid, octyl acid, nitrous acid, sulfurous acid, and aluminate.

Characteristic examples of the amine compound are ethylene-diamine, hexamethylene-diamine, diethylene-triamine, triethylene-tetramine, tetraethylene-pentamine, piperidine, piperadine, m-phenylenediamine, p-phenylenediamine, ethanolamine, triethylamine, 3-aminopropyl trimethoxysilane, 3-aminopropyl-triethoxysilane, 3-(2-aminoethyl)-aminopropyl-trimethoxysilane, 3-(2-aminoethyl)-aminopropyl-triethoxysilane, 3-(2-aminoethyl)-aminopropyl-methyl-dimethoxysilane, 3-anilinopropyl-trimethoxysilane, alkylamine salts, class-4 ammonium salts, and modified amines used as a hardener for epoxy resin, and preferably it may be 3-aminopropyl-trimethoxysilane, 3-aminopropyl-triethoxysilane, or 3-(2-aminoethyl)-aminopropyl-trimethoxysilane.

The organic metallic compound may be selected from a particular compound expressed by Formula 7 shown below (referred to as an organic metallic compound (7) hereinafter), an organic metal compound of quadrivalent tin having 1 to 2 alkyl groups where 1 to 10 carbon atoms are bonded to the corresponding number of tin atoms (referred to as an organic tin compound hereinafter), and their hydrolyzates.

$$M(OR^{10})_r(R^{11}COCHCOR^{12})_s \tag{7}$$

(wherein, M is zirconium, titan, or aluminum, $R^{10}$ and $R^{11}$ are different or identical to each other as, like $R^6$, are monovalent hydrocarbon groups having 1 to 6 carbon atoms, $R^{12}$ is monovalent a hydrocarbon group having 1 to 6 carbon atoms, like $R^6$, or an alkoxyl group having 1 to 16 carbon atoms such as methoxy, ethoxy, n-propoxy, i-propoxy, n-butoxy, sec-butoxy, t-butoxy, lauryloxy, or stearyloxy, and r and s are integers ranging from 0 to 4, (r+s)=(valence of M).)

The organic metallic compound (7) is preferably an alkoxyl group having 1 to 16 carbon atoms where r and s are integers ranging from 0 to 4 and (r+s)=(valence of M) being established.

The organic metallic compound (7) may be selected from:

(A) organic zirconium compounds including tetra-n-butoxy zirconium, tri-n-butoxy-ethylacetoacetate zirconium, di-n-butoxy-bis(ethylacetoacetate) zirconium, n-butoxy tris(ethylacetoacetate) zirconium, tetrakis(n-propylacetoacetate) zirconium, tetrakis (acetylacetoacetate) zirconiumu, and tetrakis (ethylacetoacetate) zirconiumu;

(B) organic titan compounds including tetra-i-propoxy titanium, di-i-propoxy bis(ethylacetoacetate) titanium, di-i-propoxy bis(acetylacetate) titanium, and di-i-propoxy bis(acetylacetone) titanium; and (C) organic aluminum compounds including tri-i-propoxy aluminum, di-i-propoxy ethylacetoacetate aluminum, di-i-propoxy acetylacetonate aluminum, i-propoxy bis (ethylacetoacetate) aluminum, i-propoxy bis (acetylacetonate) aluminum, tris(ethylacetoacetate) aluminum, tris(acetylacetonate) aluminum, and monoacetylacetonate bis(ethylacetoacetate) aluminum.

The organic metallic compound (7) and its partial hydrolyzate may preferably be selected from tri-n-butoxy ethylacetoacetate zirconium, di-i-propoxy bis(acetylacetonate) titanium, di-i-propoxy ethylacetoacetate aluminum, tris (ethylacetoacetate) aluminum, and their partial hydolyzates.

The organic tin compound may be selected from:

carbonic acid organic tin compounds including $(C_4H_9)_2Sn(OCOC_{11}H_{23})_2$, $(C_4H_9)_2Sn(OCOCH=CHCOOCH_3)_2$, $(C_4H_9)_2Sn(OCOCH=CHCOOC_4H_9)_2$, $(C_8H_{17})_2Sn(OCOC_8H_{17})_2$, $(C_8H_{17})_2Sn(OCOC_{11}H_{23})_2$, $(C_8H_{17})_2Sn(OCOCH=CHCOOCH_3)_2$, $(C_8H_{17})_2Sn(OCOCH=CHCOOC_4H_9)_2$, $(C_8H_{17})_2Sn(OCOCH=CHCOOC_8H_{17})_2$, $(C_8H_{17})_2Sn(OCOCH=CHCOOC_{16}H_{33})_2$, $(C_8H_{17})_2Sn(OCOCH=CHCOOC_{17}H_{35})_2$, $(C_8H_{17})_2Sn(OCOCH=CHCOOC_{18}H_{37})_2$, $(C_8H_{17})_2Sn(OCOCH=CHCOOC_{20}H_{41})_2$,

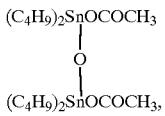

$(C_4H_9)Sn(OCOC_{11}H_{23})_3$, and $(C_4H_9)Sn(OCONa)_3$;

mercaptide organic tin compounds including
$(C_4H_9)_2Sn(SCH_2COOC_8H_{17})_2$, $(C_4H_9)_2Sn(SCH_2CH_2COOC_8H_{17})_2$,
$(C_8H_{17})_2Sn(SCH_2COOC_8H_{17})_2$, $(C_8H_{17})_2Sn(SCH_2CH_2COOC_8H_{17})_2$,
$(C_8H_{17})_2Sn(SCH_2COOC_{12}H_{25})_2$, $(C_8H_{17})_2Sn(SCH_2CH_2COOC_{12}H_{25})_2$,
$(C_4H_9)Sn(SCOCH=CHOOC_8H_{17})_3$, $(C_8H_{17})Sn(SCOCH=CHOOC_8H_{17})_3$,

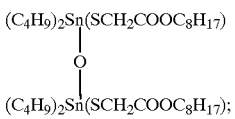

sulfide organic tin compounds including $(C_4H_9)Sn=S$, $(C_8H_{17})_2Sn=S$, and

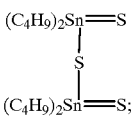

chloride organic compounds including $(C_4H_9)SnCl_3$, $(C_4H_9)_2SnCl_2$, $(C_8H_{17})_2SnCl_2$, and

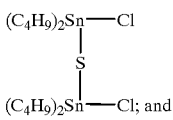

organic tin oxides including $(C_4H_9)_2SnO$ and $(C_8H_{17})_2SnO$ as well as reaction products including an ester compound produced by reaction between the organic oxide and silicate, maleic acid dimethyl, maleic acid diethyl, or phthalic acid dioctyl.

The component (f) may be provided in the form of a single substance or a combination of two or more substances and may be mixed with a zinc compound or a reaction retarder.

The component (f) may also be fed at a stage for preparation of the composition or at a stage where a coating layer or is formed or at both the stages for preparation of the composition and for forming the coating layer.

The amount of the component (f), except the organic metallic compounds, based on 100 parts by weight of the structural unit, $(R^1)_nSiO_{(4-n)/2}$, in the component (a) is generally 0 to 100 parts by weight, preferably 0.01 to 80 parts by weight, and more preferably 0.1 to 50 parts by weight. The amount of the component (f) of any organic metallic compound based on 100 parts by weight of the structural unit, $(R^1)_nSiO_{(4-n)/2}$, in the component (a) is generally 0 to 100 parts by weight, preferably 0.1 to 80 parts by weight, and more preferably 0.5 to 50 parts by weight. When the amount of the component (f) exceeds 100 parts by weight, the composition will be declined in the storage stability and its resultant coating layer will suffer from cracking.

Component (g)

Preferably, at least one of the compositions (I), (II), (i), and (ii) contains the component (g).

The component (g) may be at least one expressed by Formula 4 and selected from β-diketones, β-ketoesters, carbonic acid compounds, dihydroxy compounds, amine compounds, and oxyaldehydes.

The component (g) is preferably added when the component (f) is any organic metallic compound.

The component (g) serves as a stability enhancing agent for the composition. More specifically, it is presumed that the component (g) is coordinates bonded to metallic atoms in the organic metallic compound thus to appropriately control the promotion of co-condensation of the components (a), (b), and (b2) with the organic metallic compound, hence improving the storage stability of the composition.

Characteristic examples of the component (g) are acetyleacetone, acetoacetic acid methyl, acetoacetic acid ethyl, acetoacetic acid-n-propyl, acetoacetic acid-ai-propyl, acetoacetic acid-n-butyl, acetoacetic acid-sec-butyl, acetoacetic acid-t-butyl, hexylacetone, and acetoacetic acid ethyl.

The component (g) may be provided in the form of a single substance or a combination of two or more substances.

The amount of the component (g) based on 1 mole of the organic metallic compound is generally not smaller than 2 moles and preferably 3 to 20 moles. When the amount of the component (g) is smaller than 2 moles, improvement of the storage stability of the resultant composition will be uncertain.

Component (h)

The coating composition of the present invention may contain the component (h) described below.

The component (h) is a powder and/or a sol or a colloid form of an inorganic compound having no photocatalytic function and may be fed so that the resultant coating layer has desired properties (provided that the component (g) is not involved). The sol or colloid form of the component (h) is generally 0.001 to 100 μm in the average particle diameter.

Characteristic examples of the component (h) are AlGaAs, $Al(OH)_3$, $Sb_2O_5$, $Si_3N_4$, $Sn-In_2O_3$, $Sb-In_2O_3$, MgF, $CeF_3$, $CeO_2$, $3Al_2O_3 2SiO_2$, BeO, SiC, AlN, Fe, Co, $Co-FeO_x$, $CrO_2$, $Fe_4N$, $BaTiO_3$, $BaO-Al_2O_3-SiO_2$, Ba ferrite, $SmCO_3$, $YCO_5$, $CeCO_5$, $PrCO_5$, $Sm_2CO_{17}$, $Nd_2Fe_{14}B$, $Al_4O_3$, α-Si, $SiN_4$, CoO, $Sb-SnO_2$, $Sb_2O_5$, $MnO_2$, MnB, $Co_3O_4$, $Co_3B$, $LiTaO_3$, MgO, $MgAl_2O_4$, $BeAl_2O_4$, $ZrSiO_4$, ZnSb, PbTe, GeSi, $FeSi_2$, $CrSi_2$, $CoSi_2$, $MnSi_{1.73}$, $Mg_2Si$, β-B, BaC, BP, $TiB_2$, $ZrB_2$, $HfB_2$, $Ru_2Si_3$, $TiO_2$(rutile), $TiO_3$, $PbTiO_3$, $Al_2TiO_5$, $Zn_2SiO_4$, $Zr_2SiO_4$, $2MgO_2-Al_2O3-5SiO_2$, $Nb_2O_5$, $Li_2O-Al_2O_3-4SiO_2$, Mg ferrite, Ni ferrite, Ni—Zn ferrite, Li ferrite, and Sr ferrite.

The component (h) may be provided in the form of a single substance or a combination of two or more substances.

The component (h) may also be provided in a powder form, an aqueous sol or colloidal form where the substance is dispersed in water, or a solvent sol or colloidal form where the substance is dispersed in a polar solvent such as isopropyl alcohol or a non-polar solvent such as toluene.

The component (h) of the solvent sol or colloidal form may further be diluted with water or the solvent depending on the dispersing properties of the semiconductor substance or may be surface treated for improving the dispersing properties.

When the component (h) is the aqueous sol or colloidal form, its solid concentration may preferably be not greater than 40 percent by weight.

The method of combining the component (h) with the composition may involve feeding the component (h) after the preparation of the composition or feeding the same during the preparation of the composition to allows the hydrolysis and condensation together with the components (a), (b), and (b2) or their condensates.

The amount of the component (h) based on 100 parts by weight of the structural unit, $(R^1)_n SiO_{(4-n)/2}$, in the component (a) is generally 0 to 500 parts by weight and preferably 0.1 to 400 parts by weight in solid state.

Other Additives

The composition of the present invention may have an appropriate filler added and dispersed for improving the color and the thickness of a resultant coating layer.

The filler may be selected from non-aqueous organic and inorganic pigments, ceramics, metals, and alloys of a particle, fiber, or scale form, and their oxides, hydroxides, carbides, nitrides, and sulfides.

Characteristic examples of the filler are iron, copper, aluminum, nickel, silver, zinc, ferrite, carbon black, stainless steel, silicon dioxide, titan oxide for pigment, aluminum oxide, chrome oxide, manganese oxide, iron oxide, zirconium oxide, cobalt oxide, synthetic mullite, aluminum hydroxide, iron hydroxide, silicon carbide, silicon nitride, boron nitride, clay, diatom earth, slaked lime, gypsum, talc, barium carbonate, calcium carbonate, magnesium carbonate, barium sulfate, bentonite, mica, zinc green, chrome green, cobalt green, bilidiane, Guinier green, cobalt chrome green, shale green, green soil, manganese green, pigment green, ultramarine, deep blue, rocky blue, cobalt blue, cerlian blue, copper borate, molybdenum blue, copper sulfide, cobalt purple, mars purple, manganese purple, pigment violet, lead suboxide, calcium hydrochloride, zinc yellow, lead sulfide, chrome yellow, yellow soil, cadmium yellow, strontium yellow, titan yellow, litharge, pigment yellow, copper suboxide, cadmium red, serene red, chrome vermilion, Indian red, zinc white, antihuman white, basic lead sulfate, titan white, lithopone, lead silicate, zirconium oxide, tungsten white, lead, zinc white, Bantison white, lead phthalate, manganese white, lead sulfate, carbon black, bone black, diamond black, Sir Matmic black, plant black, potassium titanate whisker, and molybdenum disulfide.

The filler may be provided in the form of a single substance or a combination of two or more substances.

The amount of the filler based on 100 parts by weight of the solids of the composition is generally not greater than 300 parts by weight.

Other particular agents to be added to the composition of the present invention, if desired, are known dehydrating agents including orthoformate methyl, orthoacetic acid methyl, and tetraethoxysilane; dispersing agents including polyoxyethylene alkylether, polyoxyethylene alkylphenylether, polyoxyethylene fatty aid ester, polycarbonic acid polymer surfactant, polycarboxylate, polyphosphate, polyacrylate, polyamide ester salt, and polyethylene glycol; thickening agents including cellulose such as methyl cellulose, ethyl cellulose, hydroxyethyl cellulose, hydroxypropyl cellulose, or hydroxypropylmethyl cellulose, castor oil derivative, and ferrosilicate; inorganic foaming agents including ammonium carbonate, ammonium bicarbonate, ammonium subnitrate, sodium borohydride, and calcium azide; organic foaming agents including an azo compound such as azo-bisisobutyro-nitrile, a hydrazine compound such as diphenylsulfone-3,3'-disulfohydrazine, a semicarbazide compound, a triazole compound, and an N-nitroso compound; and other additives including a surfactant, a silane coupling agent, a titan coupling agent, and a dye.

Also, the composition (i) or (ii) for undercoating may be added with an ultraviolet light stabilizer for improving the resistance to climate and the long-term adhesivity. The ultraviolet light stabilizer may be a piperidine.

Moreover, a leveling agent may be combined for improving the coating performance of the composition. The leveling agent may commercially be available: as a fluorine leveling agent, BM1000 and BM1100 by BM-Chemie, Efca 772 and Efca 777 by Efca Chemicals, a Florence series by Kyoeisha Chemical, an FC series by Sumitomo 3M, and a Fluonal TF series by Toho Chemical; as a silicone leveling agent, a BYK series by BYK Chemie, a Sshmego series by Sshmegmann, and Efca 30, Efca 31, Efca 34, Efca 35, Efca 36, Efca 39, Efca83, Efca86, and Efca88by Efca Chemicals; and as an ether or ester leveling agent, Carphynol by Nisshin Chemical and Emargen and Homogenol by Kaoh.

The use of the leveling agent will improve the appearance of a finished coating layer and also allow the coating layers to be coated uniformly as a thin film.

The amount of the leveling agent to be used, based on the entirety of the component, is preferably 0.01 to 5 percent by weight and more preferably 0.02 to 3 percent by weight.

The method of combining the leveling agent may involve feeding at a stage for preparing the composition or at a stage for forming a coating layer or at both the states for preparing the composition and for forming the coating layer.

The composition of the present invention or more particularly, the composition (i) or (ii) for undercoating may be blended with another resin. Characteristic examples of the another resin are acryl-urethane resin, epoxy resin, polyester, acryl resin, fluorine resin, acryl resin emulsion, epoxy resin emulsion, urethane emulsion, and polyester emulsion.

The preparation of the composition of the present invention is not limited to a specific mixing method when the two components (f) and (g) are unused. In case that the components (f) and (g) are used, a process may preferably be employed of preparing a mixture of the components (a) to (h) excluding the component (g) and then doping the component (g) into the mixture.

The concentration of all solids in the composition (I) or (II) of the present invention is generally 3 to 50 percent by weight and preferably 5 to 40 percent by weight and may be adjusted corresponding to the purpose of application. When the solid concentration in the composition exceeds 50 percent by weight, the storage stability will be declined.

The concentration of all solids in the composition (i) or (ii) of the present invention is generally not higher than 50 percent by weight and preferably not higher than 40 percent by weight and may be adjusted depending on the type of a substrate, the method of coating, the thickness of a coating layer, and so forth.

Photocatalyst Coating Film

The photocatalyst coating film of the present invention consists mainly of ① a substrate/a composition (i) or (ii)/a composition (I) or (II), or ② a substrate/a primer/a composition (i) or (ii)/a composition (I) or (II).

The application of any of the compositions of the present invention may be conducted by a known manner such as dip coating, flow coating, spraying, screening, electric deposition, or vapor deposition or with the use of a brush, a roll coater, a flow coater, a centrifugal coater, an ultrasonic coater, or a (micro) gravure coater.

In application of the composition (i) or (ii) of the present invention, the thickness of a coating layer is substantially 0.05 to 20 μm, when dried, with one single application and 0.1 to 40 μm with two times of application. After dried at normal temperatures or heated to a temperature of 30 to 200° C. commonly for 0.5 to 60 minutes, the coating layer will set on the substrate of a desired type.

In application of the composition (I) or (II) of the present invention, the thickness of a coating layer is substantially 0.05 to 20 μm, when dried, with one single application and 0.1 to 40 μm with two times of application. After dried at normal temperatures or heated to a temperature of 30 to 200° C. commonly for 0.5 to 60 minutes, the coating lay e r will se t on the substrate of a desired type.

The total thickness of the undercoating and the overcoating may normally be 0.1 to 80 μm and preferably 0.2 to 60 μm when dried.

Substrate

The substrate which is able to associate with the composition of the present invention is provided as an organic film selected from polyesters including polyethylene terephthalate (PET), polybutylene terephthalate (PBT), and polyethylene-2.6-naphthalate (PEN); polyamides including nylon 6 and nylon 6,6; polyolefins including polyethylene (PE) and polypropylene (PP); and polyacryls including polycarbonates (PC) and polymethacrylate metyl (PMMA). The organic film may be a fluorine film such as polytetrafluoroethylene (PTFE) or ethylene-tetrafluoroethylene (ETFE).

The substrate may preliminarily be surface treated for base preparation, improvement of adhesivity, sealing of porous materials, smoothing, and particular decoration.

Characteristic examples of the surface treatment are blasting, chemical treatment, degreasing, flaming, oxidation, steam treatment, corona discharge, ultraviolet radiation, plasma treatment, and ion treatment.

The method of applying the composition of the present invention may be varied depending on the type and the condition of the substrate as well as the technique to be used. For example, a primer may also be used or not corresponding to the use.

The primer is not limited to a specific type and may be selected from a variety of materials which enable to enhance the bonding between the substrate and the composition, according to the type of the substrate and the purpose of use. The primer may also be provided in the form of a single substance or a combination of two or more substances. The primer may be an enamel containing a coloring material such as a pigment or may have transparency without such a coloring material.

Characteristic examples of the primer are alkyd resin, aminoalkyd resin, epoxy resin, polyester, acryl resin, urethane resin, fluorine resin, acrylsilicone resin, acryl resin emulsion, epoxy resin emulsion, polyurethane emulsion, and polyester emulsion. The primer may have various functional radicals when a higher degree of adhesivity is required between the film substrate and the coating layer in hostile conditions. The functional radicals include, for example, a hydroxy group, a carboxyl group, an amide group, an amine group, a glycidyl group, an alkoxysilyl group, an ether bond, and an ester bond. The primer may also contain an ultraviolet light absorber, an ultraviolet light stabilizer, and so forth.

For increasing the wear resistance and the glossiness, the coating layer of the composition of the present invention may be protected at the upper surface with a clear layer composed of, for example, a siloxane resin paint which may be a stable dispersion solution of colloidal silica and siloxane resin such as disclosed in U.S. Pat. Nos. 3,986,997 and 4,027,073.

As set forth above, the photocatalyst coating film according to the present invention is fabricated by providing a coating layer of the composition (i) or (ii) on the upper surface of an organic film substrate and providing a coating layer of the composition (I) or (II) on the coating layer of the composition (i) or (ii). The resultant photocatalyst coating film is improved in the resistance to fouling, the durability, and the transparency and has a photocatalytic function, hence preventing the (organic film) substrate from being deteriorated by exposed to light and ensuring the long-term durability and adhesivity.

EMBODIMENT

The embodiment of the present invention will be described in more detail referring to some examples. It would be understood that the present invention is not limited to the following examples.

The amounts in the examples and their relevant preparations are denoted in the unit of parts or percent on a weight basis, unless otherwise specified. The measurement and estimation of each characteristic factor was carried out by the following manners.

(1) Mw

A gel permeation chromatography (GPC) method was used under the following conditions. Test item: Tetrahydrofuran was used as a solvent. 1 g of a partial condensate of organosilane or 0.1 g of a silyl contained vinyl resin was dissolved in 100 cc of the tetrahydrofran to prepare a test item. Standard polystyrene: Standard polystyrene used was made by Pressure Chemical, U.S.A.

Apparatus: A high-temperature, high-speed gel permeation chromatogram (a model, 150-C ALC/GPC) by Waters, U.S.A.

Column: A model, Shodex A-80M (length 50 cm) by Showa Denko, Japan.

Measurement temperature: 40° C.

Flow velocity: 1 cc/min.

(2) Adhesion

A tape peeling test was conducted three times using a matrix (of 100) specified in JIS K5400 and its average was measured.

(3) Hardness

This measurement was based on a pencil hardness specified by JIS K5400.

(4) Resistance to Alkalis

After a coating test piece was immersed in a saturated calcium hydroxide solution for 60 days, its coating layers were examined by visual check. The test piece exhibiting no change was classified as "good".

(5) Resistance to Organic Chemicals

The coating test piece was applied with 2 cc of isopropyl alcohol, and wiped off after 5 minutes. Then, the test piece was visually examined. The test piece exhibiting no change was classified as "good".

(6) Resistance to Moisture

After a test piece was left at a temperature of 50° C. and a moisture of 95% for 1,000 hours continuously, its coating layers were visually examined. The test piece exhibiting no change was classified as "good".

(7) Resistance to Climate

A 3000-hour irradiation test with a Sunshine weather meter made by Suga Test was carried out conforming to JIS K5400 and the coating layers of a test piece were visually examined for the state of appearance (cracking and peeling) The test piece exhibiting no change was classified as "good".

(8) Resistance to Water

After a test piece was immersed in tap water at room temperature, the coating layers of a test piece were visually examined for the state of appearance (cracking and peeling). The test piece exhibiting no change was classified as "good".

(9) Resistance to Fouling

After the coating layers of a test piece were fouled with a mixture paste of carbon black/kerosine oil=1/2 (in weight ratio), left at room temperatures for 24 hours, and rinsed with water using a sponge, it was visually examined.
The evaluation was based on the following criteria.

○: Not fouled.

Δ: Slightly fouled.

×: Terribly fouled.

(10) Transparency

◎: Transparency of higher than 80%

○: Transparency between 60 and 80%

Δ: Transparency of smaller than 60%.

Provision 1 (of the Component (b))

In a reactor equipped with a circulating cooler and a stirrer, 70 parts of methylmethacrylate, 40 parts of n-butylacrylate, 20 parts of γ-methacryloxypropyl-trimethoxysilane, 5 parts of acrylic acid, 13 parts of 2-hydroxyethylmethacrylate, 1 part of 1,1,1-trimetylamine-methacrylimide, 1 part of 4-(meth)acryloyloxy-2,2,6,6-tetramethylpiperidine, 150 parts of i-propyl alcohol, 50 parts of methyletylketone, and 25 parts of methanol were mixed together. The mixture was then heated to 80° C. while being stirred and applied throughout a period of 30 minutes with drops of a solution prepared by dissolving 4 parts of azobisisovaleronitryl into 10 parts of xylene. After the reaction at 80 ° C. for 5 hours, a polymer solution (referred to as (b-A) hereinafter) having a solid concentration of 40% and an Mw of 11,000 was synthesized.

Provision 2 (of the Component (b))

In a reactor equipped with a circulating cooler and a stirrer, 70 parts of methylmethacrylate, 40 parts of n-butylacrylate, 20 parts of y-methacryloxypropyl-trimethoxysilane, 18 parts of glycidylmethacrylate, 1 part of 1,1,1-trimetylamine-methacrylimide, 1 part of 4-(meth) acryloyloxy-2,2,6,6-tetramethylpiperidine, 150 parts of i-propyl alcohol, 50 parts of methyletylketone, and 25 parts of methanol were mixed together. The mixture was then heated to 80° C. while being stirred and applied throughout a period of 30 minutes with drops of a solution prepared by dissolving 4 parts of azobisisovaleronitryl into 10 parts of xylene. After the reaction at 80° C. for 5 hours, a polymer solution (referred to as (b-B) hereinafter) having a solid concentration of 40% and an Mw of 13,000 was synthesized.

Provision 3 (of the Component (b))

In a reactor equipped with a circulating cooler and a stirrer, 70 parts of methylmethacrylate, 40 parts of n-butyleacrlate, 20 parts of y-methacryloxypropyl-trimethoxysilane, 18 parts of hydroxyacrylate, 10 parts of acrylamide, 1 part of 1,1,1-trimetylamine-methacrylimide, 1 part of 4-(meth)acryloyloxy-2,2,6,6-tetramethylpiperidine, 150 parts of i-propyl alcohol, 50 parts of methyletylketone, and 25 parts of methanol were mixed together. The mixture was then heated to 80° C. while being stirred and applied throughout a period of 30 minutes with drops of a solution prepared by dissolving 4 parts of azobisisovaleronitryl into 10 parts of xylene. After the reaction at 80° C. for 5 hours, a polymer solution (referred to as (b-C) hereinafter) having a solid concentration of 40% and an Mw of 10,000 was synthesized.

Provision 4 (of the Component (b2))

A stainless autoclave equipped with an electromagnetic stirrer was subjected to substitution with a nitrogen gas and filled with 250 parts of methylisobutylketone, 30 parts of ethylvinylether, and 2 parts of lauroyl peroxide (a radical polymer initiator) to prepare a solution. The solution was then cooled down to −50° C. with dry ice-methanol and oxygen in the autoclave was removed out using a nitrogen gas. Then, the remaining was added with 20 parts of hexafluoropropylene, 45 parts of perfluoro (mehylvinylether), and 5 parts of vinyl trimethoxysilane and heated up. When the temperature in the autoclave was increased up to 60° C., the interior pressure was 5 kgf/cm$^2$.

The mixture was stirred while being kept at a reacting temperature of 60° C. to continue the reaction for polymerization for 20 hours. When the pressure in the autoclave dropped down to 1.5 kgf/cm$^2$, the mixture was cooled down with water to cease the reaction. A resultant polymer solution was 40% in the solid concentration and 30,000 in the Mw (referred to as (b2-A)).

Provision 5 to 7 (o the Component b2)

By the same manner as of Provision 4 except that the monomers used were as shown in Table 1, polymer solutions (b2-B to b2-D) having a solid concentration of 40% were prepared.

TABLE 1

| Provisions<br>Polymers | 4<br>B2-A | 5<br>B2-B | 6<br>B2-C | 7<br>B2-D |
| --- | --- | --- | --- | --- |
| Monomer (b2-1), hexafluoropropylene | 20 | — | 65 | 10 |
| Monomer (b2-2), perfluoro-Methylvinylether | 45 | 65 | — | 10 |
| Monomer (b2-3), vinyltrimethoxysilane | 5 | 5 | 5 | 50 |
| Monomer (b2-4), ethylenevinylether | 30 | 30 | 30 | 30 |
| Solvent, methylisobutylketone | 150 | 150 | 150 | 150 |
| Mw | 30,000 | 30,000 | 30,000 | 25,000 |

Provision 8 (of a Primer)

100 parts of the polymer solution (b2-A) of Preparation 1 was mixed and stirred with 80 parts of methylethylketone and 20 parts of i-propyl alcohol. Then, the mixture was added with 20 parts of a zinc oxide (having 30% of a dispersed-in-toluene solid concentration) adjusted by methylethylketone to a solid concentration of 20% thus to prepare a primer having 20% of a solid concentration (referred to as (p-1) hereinafter).

Preparations 1 to 27 (of the Composition for Overcoating)

In a reactor equipped with a stirrer and a circulating cooler, a combination of the components listed in Tables 2 to 7 (excluding acetylacetone) were mixed up and stirred for reaction at 60° C. for 4 hours. Then, the mixture was added with an acetylacetone and cooled down to a room temperature to prepare a composition having a solid concentration of 20%. 100 parts of the composition was mixed and stirred with 100 parts of i-propyl alcohol and further added with 10 parts of an i-propyl alcohol solution (15% of a solid) of dibutyl-tin-acetate and a silicate oligomer to yield the overcoating compositions (I-1) to (I-9) and (II-1) to (II-18).

TABLE 2

| Preparations<br>Compositions | 1<br>I-1 | 2<br>I-2 | 3<br>I-3 | 4<br>I-4 | 5<br>I-5 |
|---|---|---|---|---|---|
| Mixture (in parts) | | | | | |
| Component (a) | | | | | |
| tetraethoxysilane | | | 30 | 30 | |
| methylsilicate (MS51) | | | | 30 | |
| methyltrimethoxysilane | 70 | 70 | 40 | 70 | |
| methylsilicone resin[*1] | | | | | 30 |
| dimethyldimethoxysilane | 30 | | 30 | | |
| Component (c) | | | | | |
| TiO$_2$ dispersed in water[*3] | 250 | 250 | 250 | 250 | 250 |
| Component (f) | | | | | |
| di-i-propoxy-ethyl-acetoacetatealuminum | 10 | 10 | 10 | 10 | 10 |
| hydrochloric acid (10$^{-2}$ mol/l) | | | | | |
| Solvent | | | | | |
| Water | (200) | (200) | (200) | (200) | (200) |
| i-propyl alcohol | 70 | 70 | 70 | 70 | 70 |
| diethyleneglycol-monoethylether | 70 | 70 | 70 | 70 | 70 |
| Additive (in parts) | | | | | |
| Component (g) | | | | | |
| acetylacetone | 10 | 10 | 10 | 10 | 10 |

TABLE 3

| Preparations<br>Compositions | 6<br>I-6 | 7<br>I-7 | 8<br>I-8 | 9<br>I-9 |
|---|---|---|---|---|
| Mixture (in parts) | | | | |
| Component (a) | | | | |
| tetraethoxysilane | | | | |
| methylsilicate (MS51) | | | | |
| methytrimethoxysilane | 70 | 70 | 70 | 70 |
| methylsilicon resin[*1] | | | | |
| dimethyldimethoxysilane | | 30 | 30 | 30 |
| polydimethylsiloxane[*2] | 30 | | | |
| Component (c) | | | | |
| TiO$_2$ dispersed in water[*3] | 250 | | 850 | 40 |
| TiO$_2$ dispersed in IPA[*4] | | 250 | | |
| Component (f) | | | | |
| di-i-propoxy-ethyl-acetoacetatealuminum | 10 | | 10 | 10 |
| hydrochloric acid (10$^{-2}$ mol/l) | | 30 | | |
| Solvent | | | | |
| Water | (200) | | (680) | (32) |
| i-propyl alcohol | 70 | 55 | 70 | 70 |
| diethyleneglycol-monoethylether | 70 | 55 | 70 | 70 |

TABLE 3-continued

| Preparations<br>Compositions | 6<br>I-6 | 7<br>I-7 | 8<br>I-8 | 9<br>I-9 |
|---|---|---|---|---|
| Additive (in parts) | | | | |
| Component (g) | | | | |
| acetylacetone | 10 | 10 | 10 | 10 |

TABLE 4

| Preparations<br>Compositions | 10<br>II-1 | 11<br>II-2 | 12<br>II-3 | 13<br>II-4 | 14<br>II-5 |
|---|---|---|---|---|---|
| Mixture (in parts) | | | | | |
| Component (a) | | | | | |
| methylsilicate (MS51) | | | 40 | | 30 |
| methytrimethoxysilane | 70 | 60 | 60 | 70 | 40 |
| methylsilicone resin[*1] | | 40 | | | |
| dimethyldimethoxysilane | 30 | | | | 30 |
| polydimethylsiloxane[*2] | | | | 30 | |
| Component (b) | | | | | |
| (b-A) having 40% solids | 50 | 50 | 50 | 50 | |
| (b-B) having 40% solids | | | | | 50 |
| Component (c) | | | | | |
| TiO$_2$ dispersed in water[*3] | 350 | 350 | 350 | 350 | 350 |
| TiO$_2$ dispersed in IPA[*4] | | | | | |
| Component (f) | | | | | |
| di-i-propoxy-ethyl-acetoacetatealuminum | 10 | 10 | 10 | 10 | 10 |
| water | (280) | (280) | (280) | (280) | (280) |
| i-isopropyl alcohol | 100 | 100 | 100 | 100 | 100 |
| diethyleneglycol-monoethylether | 100 | 100 | 100 | 100 | 100 |
| Additive (in parts) | | | | | |
| Component (g) | | | | | |
| acetylacetone | 10 | 10 | 10 | 10 | 10 |

TABLE 5

| Preparations<br>Compositions | 15<br>II-6 | 16<br>II-7 | 17<br>II-8 | 18<br>II-9 |
|---|---|---|---|---|
| Mixture (in parts) | | | | |
| Component (a) | | | | |
| tetraethoxysilane | | | | |
| methylsilicate (MS51) | | | | |
| methytrimethoxysilane | 70 | 70 | 70 | 70 |
| methylsilicone resin[*1] | | | | |
| dimethyldimethoxysilane | 30 | 30 | 30 | 30 |
| polydimethylsiloxane[*2] | | | | |
| Component (b) | | | | |
| (b-A) having 40% solids | | 50 | 50 | 120 |
| (b-B) having 40% solids | 50 | | | |
| Component (c) | | | | |
| TiO$_2$ dispersed in water[*3] | | 850 | 40 | 350 |
| TiO$_2$ dispersed in IPA[*4] | 350 | | | |
| Component (f) | | | | |
| di-i-propoxy ethyl-acetoacetatealuminum | 10 | 10 | 10 | 10 |
| Water | 30 | (680) | (32) | (280) |
| i-propyl alcohol | 85 | 100 | 90 | 100 |
| diethyleneglycol-monoethylether | 85 | 100 | 90 | 100 |

TABLE 5-continued

| Preparations | 15 | 16 | 17 | 18 |
|---|---|---|---|---|
| Compositions | II-6 | II-7 | II-8 | II-9 |
| Additive (in parts) | | | | |
| Component (g) | | | | |
| acetylacetone | 10 | 10 | 10 | 10 |

TABLE 6

| Preparations | 19 | 20 | 21 | 22 | 23 |
|---|---|---|---|---|---|
| Compositions | II-10 | II-11 | II-12 | II-13 | II-14 |
| Mixture (in parts) | | | | | |
| Component (a) | | | | | |
| methytrimethoxysilane | 70 | 70 | 70 | 70 | 70 |
| dimethyldimethoxysilane | 30 | 30 | 30 | 30 | 30 |
| Component (b) | | | | | |
| (b2-A) having 40% solids | 50 | | | | |
| (b2-B) having 40% solids | | 50 | | | |
| (b2-C) having 40% solids | | | 50 | | |
| (b2-D) having 40% solids | | | | 50 | 30 |
| (b-A) having 40% solids | | | | | 20 |
| Component (c) | | | | | |
| $TiO_2$ dispersed in water[*5] | 100 | 100 | 100 | 100 | 100 |
| $TiO_2$ dispersed in toluene[*6] | | | | | |
| Component (f) | | | | | |
| tris(ethylacetoacetate)-aluminum | 5 | 5 | 5 | 5 | 5 |
| water | (70) | (70) | (70) | (70) | (70) |
| methylethylketone | 200 | 200 | 200 | 200 | 200 |
| i-isopropyl alcohol | 50 | 50 | 50 | 50 | 50 |
| Additive (in parts) | | | | | |
| Component (g) | | | | | |
| acetylacetone | 5 | 5 | 5 | 5 | 5 |

TABLE 7

| Preparations | 24 | 25 | 26 | 27 |
|---|---|---|---|---|
| Compositions | II-15 | II-16 | II-17 | II-18 |
| Mixture (in parts) | | | | |
| Component (a) | | | | |
| methytrimethoxysilane | 70 | 70 | 70 | 70 |
| dimethyldimethoxysilane | 30 | 30 | 30 | 30 |
| Component (b2) | | | | |
| (b2-A) having 40% solids | 50 | 50 | 50 | 50 |
| Component (c) | | | | |
| $TiO_2$ dispersed in water[*5] | 12 | 50 | | 100 |
| ZnO dispersed in toluene[*6] | | | 50 | |
| Component (f) | | | | |
| tris(ethylaceto-acetatealuminum | 5 | 5 | 5 | 5 |
| Component (e) | | | | |
| $SiO_2$ dispersed in MEK[*7] | | | | |
| Water | (8) | (35) | 10 | (70) |
| Methylethylketone | 160 | 185 | 160 | 200 |
| i-propyl alcohol | 40 | 45 | 40 | 50 |
| Additive (in parts) | | | | |
| Component (g) | | | | |
| acetylacetone | 5 | 5 | 5 | 5 |

Throughout Tables 2 to 7, *1 to *7 are as follows,
*1: Methylsilicone resin (Mw:500) made by Shinetsu Chemical,
*2: Polydimethylsiloxane containing ethoxysilane (Mw:5,000) Mw made by Nippon Unica,
*3: Anatase type titan oxide (20% concentration in solid) dispersed in water (pH4),
*4: Anatase type titan oxide (20% concentration in solid) dispersed in i-propylalcohol,
*5: Anatase type titan oxide (30% concentration in solid) dispersed in water (pH4),
*6: Zinc oxide (30% concentration in solid) dispersed in toluene,
*7: Silica sol (30% concentration in solid) dispersed in methylethylketone.

Preparation 28 (of the Composition for Overcoating)

In a reactor equipped with a stirrer and a circulating cooler, a combination of the components (excluding the additive component) listed in Table 8 were mixed up and stirred for reaction at 60° C. for 4 hours. Then, the mixture was added with 5 parts of acetylacetone, stirred for one hour, and cooled down at a room temperature. The mixture was further added with i-propyl alcohol, diethylglycol monoethylether, and methnol of the additive component to yield the overcoating composition (I-10) having a solid concentration of 10%.

Preparations 29 and 43 (of the Composition for Overcoating)

In a reactor equipped with a stirrer and a circulating cooler, a combination of the components (excluding the component (c), the water, and the additive component) listed in Table 8 or 10 were mixed up and heated to 50° C. while being stirred. Then, the mixture was added with 30 parts of water by drop application throughout a period of 30 minutes and left for reaction at 60° C. for 4 hours. The mixture was then added with 5 parts of acetylacetone, stirred for one hour, and cooled down to a room temperature. The mixture was further added with the component (c) and the additive component containing i-propyl alcohol, diethylglycol monoethylether, and methnol listed in Table 8 or 10 to yield the overcoating compositions (I-11) and (II-22) having a solid concentration of 10%.

Preparations 30 to 39 and 44 to 46 (of the Composition for Overcoating)

In a reactor equipped with a stirrer and a circulating cooler, a combination of the components (excluding the component (c), the component (e), the water, and the additive component) listed in Table 8 or 10 were mixed up and heated to 50° C. while being stirred. Then, the mixture was added with 30 parts of water by drop application throughout a period of 30 minutes and left for reaction at 60° C. for 4 hours. The mixture was then added with 5 parts of acetylacetone, stirred for one hour, and cooled down to a room temperature. The mixture was further added with the component (c), the component (e), and the additive component containing i-propyl alcohol, diethylglycol monoethylether, and methnol listed in Table 8 or 10 to yield the overcoating compositions (I-12) to (I-21) and (II-23) to (II-25) having a solid concentration of 10%.

Preparations 40 to 42 (of the Composition for Overcoating)

In a reactor equipped with a stirrer and a circulating cooler, a combination of the components (excluding the component (e) and the additive component) listed in Table 11 were mixed up and stirred for reaction at 60° C. for 4 hours. Then, the mixture was added with 6 parts of acetylacetone, stirred for one hour, and cooled down to a room temperature. The mixture was further added with the component (e) and the additive component containing i-propyl alcohol, diethylglycol monoethylether, and methnol listed in Table 11 to yield the overcoating compositions (II-19) to (II-21).

TABLE 8

| Preparations<br>Compositions | 28<br>I-10 | 29<br>I-11 | 30<br>I-12 | 31<br>I-13 | 32<br>I-14 | 33<br>I-15 |
|---|---|---|---|---|---|---|
| Mixture (in parts) | | | | | | |
| Component (a) | | | | | | |
| methytrimethoxysilane | 101 | 101 | 81 | 81 | 122 | 122 |
| dimethyldimethoxysilane | | | 16 | 16 | 16 | |
| 3-glycidydoxypropyl-trimethoxysilane | | | 14 | | | |
| (a2-1) | 50 | 50 | | | | |
| (a2-2) | | | | 50 | | |
| (a2-3) | | | | | 50 | |
| (a2-4) | | | | | 30 | 30 |
| Component (c) | | | | | | |
| TiO₂ dispersed in water (20%) | 300 | 150 | 150 | 200 | 300 | 150 |
| Component (e) | | | | | | |
| colloidal silica (30% methanol dispersion) | | 100 | | | | 100 |
| colloidal alumina (20% water dispersion) | | | 150 | | | |
| water | | 30 | 30 | 30 | 30 | 30 |
| i-propylalcohol | 82 | 152 | 158 | 156 | 135 | 135 |
| Component (f) | | | | | | |
| di-i-propoxy-ethyl-acetoacetatealuminum | 5 | 5 | 5 | 5 | 5 | 5 |
| Additive (in parts) | | | | | | |
| Component (g) | | | | | | |
| acetylacetone | 5 | 5 | 5 | 5 | 5 | 5 |
| i-propylalcohol | 355 | 339 | 322 | 289 | 322 | 339 |
| diethyleneglycol-monoethylether | 355 | 339 | 322 | 289 | 322 | 339 |
| methanol | 355 | 339 | 322 | 289 | 322 | 339 |

TABLE 9

| Preparations<br>Compositions | 34<br>I-16 | 35<br>I-17 | 36<br>I-18 | 37<br>I-19 | 38<br>I-20 | 39<br>I-21 |
|---|---|---|---|---|---|---|
| Mixture (in parts) | | | | | | |
| Component (a) | | | | | | |
| methytrimethoxysilane | 122 | 122 | 122 | 81 | 81 | 81 |
| dimethyldimethoxysilane | | | | | | |
| 3-glycidoxypropyl-trimethoxysilane | 14 | 14 | | 14 | 14 | 14 |
| (a2-1) | | | | 20 | 20 | 20 |
| (a2-2) | | | | | | |
| (a2-3) | | | | | | |
| (a2-4) | 30 | 30 | 40 | 30 | 30 | 30 |
| Component (c) | | | | | | |
| TiO₂ dispersed in water (20%) | 300 | 200 | 150 | 300 | 200 | 150 |
| Component (e) | | | | | | |
| colloidal silica (30% methanol dispersion) | | | 100 | | | 100 |
| colloidal alumina (20% water dispersion) | | | | | | |
| water | 30 | 30 | 30 | 30 | 30 | 30 |
| i-propylalcohol | 137 | 137 | 141 | 158 | 158 | 158 |

TABLE 9-continued

| Preparations<br>Compositions | 34<br>I-16 | 35<br>I-17 | 36<br>I-18 | 37<br>I-19 | 38<br>I-20 | 39<br>I-21 |
|---|---|---|---|---|---|---|
| Component (f) | | | | | | |
| di-i-propoxy-ethyl-acetoacetatealuminum | 5 | 5 | 5 | 5 | 5 | 5 |
| Additive (in parts) | | | | | | |
| Component (g) | | | | | | |
| acetylacetone | 5 | 5 | 5 | 5 | 5 | 5 |
| i-propylalcohol | 322 | 289 | 339 | 322 | 289 | 339 |
| diethyleneglycol-monoethylether | 322 | 289 | 339 | 322 | 289 | 339 |
| methanol | 322 | 289 | 339 | 322 | 289 | 339 |

(wherein, (a2-1) is a trifunctional oligomer (Mw:800) containing terminal alkoxysilyl group, (a2-2) is a trifunctional oligomer (Mw: 8,000) containing terminal alkoxysilyl group, (a2-3) is a trifunctional oligomer (Mw:35,000) containing terminal alkoxysilyl group, and (a2-4) is a bifunctional oligomer (Mw:10,000) containing terminal alkoxysilyl group/poly(oxyethylene/oxypropylene).)

TABLE 10

| Preparation<br>Compositions | 40<br>II-19 | 41<br>II-20 | 42<br>II-21 | 43<br>II-22 |
|---|---|---|---|---|
| Mixture (in parts) | | | | |
| Component (a) | | | | |
| methytrimethoxysilane | 81 | 81 | 101 | 101 |
| dimethyldimethoxysilane | 49 | 32 | 49 | 32 |
| γ-methacryloxypropyl-trimethoxysilane | | | | 3 |
| Component (b) | | | | |
| (b-A) having 40% solids | 75 | 100 | | |
| (b-B) having 40% solids | | | 50 | 75 |
| Component (c) | | | | |
| colloidal silica (30% methanol dispersion) | 67 | 100 | | 133 |
| colloidal silica (20% water dispersion) | | | 100 | |
| Component (d) | | | | |
| TiO₂ dispersed in water (20%) | 100 | 100 | 150 | 50 |
| Water | | | | 25 |
| i-propyl alcohol | 58 | 56 | 56 | 33 |
| diethyleneglycol-monoethylether | 58 | 56 | 56 | 33 |
| methanol | 58 | 56 | 56 | 33 |
| Component (f) | | | | |
| di-i-propoxy-ethyl-acetoacetatealuminum | 6 | 6 | 6 | 6 |
| Additive (in parts) | | | | |
| Component (g) | | | | |
| acetylacetone | 6 | 6 | 6 | 6 |
| i-propyl alcohol | 285 | 306 | 283 | 327 |
| diethyleneglycol-monoethylether | 285 | 306 | 283 | 327 |
| methanol | 285 | 306 | 283 | 327 |

TABLE 11

| Preparation | 44 | 45 | 46 |
|---|---|---|---|
| Compositions | II-23 | II-24 | II-25 |
| Mixture (in parts) | | | |
| Component (a) | | | |
| methytrimethoxysilane | 101 | 61 | 61 |
| dimethyldimethoxysilane | 32 | 49 | 49 |
| γ-glycidydoxypropyl-trimethoxysilane | | 14 | 14 |
| γ-methacryloxypropyl-trimethoxysilane | 2 | 2 | 2 |
| Component (b) | | | |
| (b-A) having 40% solids | 75 | 75 | |
| (b-B) having 40% solids | | | 75 |
| Component (c) | | | |
| colloidal silica (30% methanol dispersion) | 67 | 67 | 100 |
| colloidal alumina (20% water dispersion) | | | |
| Component (d) | | | |
| TiO$_2$ dispersed in water (20%) | 100 | 100 | 100 |
| Water | 25 | 25 | 25 |
| Component (f) | | | |
| di-i-propoxy-ethyl-acetoacetatealuminum | 6 | 6 | 6 |
| Additive (in parts) | | | |
| Component (g) | | | |
| acetylacetone | 6 | 6 | 6 |
| i-propyl alcohol | 333 | 336 | 359 |
| diethyleneglycol-monoethylether | 333 | 336 | 359 |
| methanol | 333 | 336 | 359 |

TABLE 12

| Preparations | 47 | 48 | 49 | 50 | 51 |
|---|---|---|---|---|---|
| Compositions | i-1 | i-2 | ii-1 | ii-2 | ii-3 |
| Mixture (in parts) | | | | | |
| Component (a) | | | | | |
| methytrimethoxysilane | 70 | 70 | 70 | 70 | 70 |
| dimethyldimethoxysilane | 30 | 30 | 30 | 30 | 30 |
| Component (b) | | | | | |
| (b-A) having 40% solids | | | 100 | 100 | 80 |
| (b2-A) having 40% solids | | | | | 20 |
| Component (d) | | 15 | | 15 | 15 |
| ZnO dispersed in IPA*[8] | | | | | |
| Component (f) | 10 | 10 | 10 | 10 | 10 |
| di-i-propoxy-ethyl-acetoacetatealuminum | | | | | |
| Solvent | | | | | |
| water | 30 | 30 | 30 | 30 | 30 |
| i-propylalcohol | 30 | 30 | 30 | 30 | 30 |
| ethyleneglycol-monobutylether | 30 | 30 | 30 | 30 | 30 |
| Additive (in parts) | | | | | |
| Component (g) | 10 | 10 | 10 | 10 | 10 |
| acetylacetone | | | | | |

(*[8] Zinc oxide dispersed in i-propylalcohol (30% concentration in solid).

TABLE 13

| Preparations | 52 | 53 | 54 | 55 | 56 | 57 |
|---|---|---|---|---|---|---|
| Compositions | ii-4 | ii-5 | ii-6 | ii-7 | ii-8 | ii-9 |
| Mixture (in parts) | | | | | | |
| Component (a) | | | | | | |
| methytrimethoxysilane | 41 | 41 | 71 | 71 | 71 | 58 |
| dimethyldimethoxysilane | 16 | 16 | 24 | 24 | 24 | 19 |
| Component (b) | | | | | | |
| (b-A) having 40% solids | | 175 | | | | 150 |
| (b-B) having 40% solids | 175 | | 125 | 125 | 125 | |
| Component (d) | | | | | | |
| ZnO$_2$ (IPA dispersion, 10% solids) | | 200 | | | | |
| CeO$_2$ (IBA dispersion, 10% solids) | 200 | | 300 | | | |
| 2,4-hydroxybenzophenone | | | | 5 | | |
| 2-(2'-hydroxy-5'-methylphenyl)benzotriazole | | | | | 15 | |
| Component (e) | | | | | | |
| colloidal silica (IPA dispersion, 10%) | | | 300 | 300 | 300 | 300 |
| water | 20 | 20 | 20 | 20 | 20 | 20 |
| i-propylalcohol | 54 | 54 | 62 | 62 | 62 | 58 |
| methylethylketone | 27 | 27 | 31 | 31 | 31 | 29 |
| Component (f) | 3 | 3 | 3 | 3 | 3 | 3 |
| di-i-propoxyethyl-acetoacetatealuminum | | | | | | |
| Additive (in parts) | | | | | | |
| Component (g) | | | | | | |
| acetylacetone | 3 | 3 | 3 | 3 | 3 | 3 |
| i-butylalcohol | 166 | 166 | 222 | 222 | 222 | 166 |
| metylisobutylketone | 417 | 417 | 444 | 444 | 444 | 417 |
| ethyleneglycol-monobutylether | 83 | 83 | | | | 83 |

Preparations 47 to 51 (of the Composition for Undercoating)

In reactor equipped with a circulating cooler, a combination of the components (excluding the water and the additive component) as listed in Table 12 were mixed together, stirred, and added with 30 parts of water as being stirred for reaction at 60° C. for 4 hours. Then, the mixture was combined with the additive component and cooled down to a room temperature to prepare a composition having 30% of a solid concentration. 100 parts of the composition was mixed with 100 parts of i-butyl alcohol and 100 parts of propyleneglycol monomethyletheracetate and further added with 10 parts of an i-propylalcohol solution (15% solids) of dioctyl-tin-dimaleate-ester to yield the undercoating compositions (i-1), (i-2), and (ii-1) to (ii-3).

Preparations 52 to 57 (of the Composition for Undercoating)

In reactor equipped with a circulating cooler, a combination of the components (excluding the component (e), the ultraviolet light absorber, the water, and the additive component) as listed in Table 13 were mixed and heated up to 50° C. while being stirred. Then, the mixture was added with 20 parts of water throughout a period of 30 minutes and left for reaction at 60° C. for 4 hours. Then, the mixture was combined with acetylacetone, stirred for one hour, and cooled down to a room temperature. The mixture was further added with the component (e), the ultraviolet light absorber, and the additive component to yield the undercoating compositions (ii-4) to (ii-9).

EXAMPLES 1 TO 32

Each of the undercoating compositions listed in Table 12 was applied to the surface of a 50 μm-thick PET film to have an undercoating of 1 μm in thickness when dried. Then, a corresponding type of the overcoating composition was applied to the undercoating to have an overcoating of 0.2 μm in thickness when dried. After cured, a resultant coating film was analyzed for a variety of the characteristics.

The result of the analysis is shown in Tables 14 to 17.

TABLE 14

| Examples | 1 | 2 | 3 | 4 | 5 | 6 | 7 | 8 |
|---|---|---|---|---|---|---|---|---|
| Undercoating | i-1 | i-2 | ii-1 | ii-2 | p-1/i-1 | ii-2 | ii-2 | ii-2 |
| Overcoating | I-1 | I-1 | I-1 | I-1 | I-1 | I-2 | I-3 | I-4 |
| Adhesion (piece/100) | 100 | 100 | 100 | 100 | 100 | 100 | 100 | 100 |
| Pencil hardness | 3H | 3H | 3H | 3H | 3H | 3H | 3H | 3H |
| Resistance to alkalis | good | good | good | good | good | good | good | good |
| Resistance to chemicals | good | good | good | good | good | good | good | good |
| Resistance to moisture | good | good | good | good | good | good | good | good |
| Resistance to climate | good | good | good | good | good | good | good | good |
| Resistance to water | good | good | good | good | good | good | good | good |
| Resistance to fouling | ◎ | ◎ | ◎ | ◎ | ◎ | ◎ | ◎ | ◎ |
| Transparency | ○ | ○ | ○ | ○ | ○ | ○ | ○ | ○ |

TABLE 15

| Examples | 9 | 10 | 11 | 12 | 13 | 14 | 15 | 16 |
|---|---|---|---|---|---|---|---|---|
| Undercoating | ii-2 | ii-2 | ii-2 | ii-2 | ii-2 | ii-2 | ii-2 | ii-2 |
| Overcoating | I-5 | I-6 | I-7 | I-8 | I-9 | II-1 | II-2 | II-3 |
| Adhesion (piece/100) | 100 | 100 | 100 | 100 | 100 | 100 | 100 | 100 |
| Pencil hardness | 3H | 3H | 3H | 3H | 3H | 2H | 2H | 2H |
| Resistance to alkalis | good | good | good | good | good | good | good | good |
| Resistance to chemicals | good | good | good | good | good | good | good | good |
| Resistance to moisture | good | good | good | good | good | good | good | good |
| Resistance to climate | good | good | good | good | good | good | good | good |
| Resistance to water | good | good | good | good | good | good | good | good |
| Resistance to fouling | ◎ | ◎ | ◎ | ◎ | ◎ | ◎ | ◎ | ◎ |
| Transparency | ○ | ○ | ○ | ○ | ○ | ○ | ○ | ○ |

TABLE 16

| Examples | 17 | 18 | 19 | 20 | 21 | 22 | 23 | 24 |
|---|---|---|---|---|---|---|---|---|
| Undercoating | ii-2 | ii-2 | ii-2 | ii-2 | ii-2 | ii-2 | ii-3 | ii-2 |
| Overcoating | II-4 | II-5 | II-6 | II-7 | II-8 | II-9 | II-10 | II-11 |
| Adhesion (piece/100) | 100 | 100 | 100 | 100 | 100 | 100 | 100 | 100 |
| Pencil hardness | 2H | 2H | 2H | 2H | 2H | 2H | 3H | 3H |
| Resistance to alkalis | good | good | good | good | good | good | good | good |
| Resistance to chemicals | good | good | good | good | good | good | good | good |
| Resistance to moisture | good | good | good | good | good | good | good | good |
| Resistance to climate | good | good | good | good | good | good | good | good |
| Resistance to water | good | good | good | good | good | good | good | good |
| Resistance to fouling | ◎ | ◎ | ◎ | ◎ | ◎ | ◎ | ◎ | ◎ |
| Transparency | ○ | ○ | ○ | ○ | ○ | ○ | ○ | ○ |

TABLE 17

| Examples | 25 | 26 | 27 | 28 | 29 | 30 | 31 | 32 |
|---|---|---|---|---|---|---|---|---|
| Undercoating | ii-2 | ii-2 | ii-2 | ii-2 | ii-2 | ii-2 | ii-2 | ii-2 |
| Overcoating | II-12 | II-13 | II-14 | II-15 | II-16 | II-17 | II-18 | II-19 |
| Adhesion (piece/100) | 100 | 100 | 100 | 100 | 100 | 100 | 100 | 100 |
| Pencil hardness | 3H | 3H | 3H | 3H | 3H | 3H | 3H | 3H |
| Resistance to alkalis | good | good | good | good | good | good | good | good |
| Resistance to chemicals | good | good | good | good | good | good | good | good |
| Resistance to moisture | good | good | good | good | good | good | good | good |
| Resistance to climate | good | good | good | good | good | good | good | good |
| Resistance to water | good | good | good | good | good | good | good | good |
| Resistance to fouling | ◎ | ◎ | ◎ | ◎ | ◎ | ◎ | ◎ | ◎ |
| Transparency | ○ | ○ | ○ | ○ | ○ | ○ | ○ | ○ |

EXAMPLES 33 TO 100

Each of the undercoating compositions was applied to the surface of a 50 μm-thick PET film to have an undercoating of 1 μm in thickness when dried. Then, a corresponding type of the overcoating composition was applied to the undercoating to have an overcoating of 0.1 μm in thickness when dried. After cured, a resultant coating film was analyzed for a variety of the characteristics.

The result of the analysis is shown in Tables 18 to 26.

TABLE 18

| Examples | 33 | 34 | 35 | 36 | 37 | 38 | 39 | 40 |
|---|---|---|---|---|---|---|---|---|
| Undercoating | ii-4 | ii-4 | ii-4 | ii-4 | ii-4 | ii-4 | ii-4 | ii-4 |
| Overcoating | I-10 | I-11 | I-12 | I-13 | I-14 | I-15 | I-16 | I-17 |
| Adhesion (piece/100) | 100 | 100 | 100 | 100 | 100 | 100 | 100 | 100 |
| Pencil hardness | 4H | 4H | 4H | 4H | 4H | 4H | 4H | 4H |
| Resistance to alkalis | good | good | good | good | good | good | good | good |
| Resistance to chemicals | good | good | good | good | good | good | good | good |
| Resistance to moisture | good | good | good | good | good | good | good | good |
| Resistance to climate | good | good | good | good | good | good | good | good |
| Resistance to water | good | good | good | good | good | good | good | good |
| Resistance to fouling | ◎ | ◎ | ◎ | ◎ | ◎ | ◎ | ◎ | ◎ |
| Transparency | ○ | ○ | ○ | ○ | ○ | ○ | ○ | ○ |

TABLE 19

| Examples | 41 | 42 | 43 | 44 | 45 | 46 | 47 | 48 |
|---|---|---|---|---|---|---|---|---|
| Undercoating | ii-4 | ii-4 | ii-4 | ii-4 | ii-5 | ii-5 | ii-5 | ii-5 |
| Overcoating | I-18 | I-19 | I-20 | I-21 | I-10 | I-12 | I-14 | I-16 |
| Adhesion (piece/100) | 100 | 100 | 100 | 100 | 100 | 100 | 100 | 100 |
| Pencil hardness | 4H | 4H | 4H | 4H | 4H | 3H | 4H | 3H |
| Resistance to alkalis | good | good | good | good | good | good | good | good |
| Resistance to chemicals | good | good | good | good | good | good | good | good |
| Resistance to moisture | good | good | good | good | good | good | good | good |
| Resistance to climate | good | good | good | good | good | good | good | good |
| Resistance to water | good | good | good | good | good | good | good | good |
| Resistance to fouling | ⊙ | ⊙ | ⊙ | ⊙ | ⊙ | ⊙ | ⊙ | ⊙ |
| Transparency | ○ | ○ | ○ | ○ | ○ | ○ | ○ | ○ |

TABLE 20

| Examples | 49 | 50 | 51 | 52 | 53 | 54 | 55 | 56 |
|---|---|---|---|---|---|---|---|---|
| Undercoating | ii-5 | ii-5 | ii-5 | ii-6 | ii-6 | ii-6 | ii-6 | ii-6 |
| Overcoating | I-17 | I-19 | I-21 | I-10 | I-11 | I-12 | I-13 | I-14 |
| Adhesion (piece/100) | 100 | 100 | 100 | 100 | 100 | 100 | 100 | 100 |
| Pencil hardness | 4H | 4H | 4H | 4H | 4H | 4H | 4H | 4H |
| Resistance to alkalis | good | good | good | good | good | good | good | good |
| Resistance to chemicals | good | good | good | good | good | good | good | good |
| Resistance to moisture | good | good | good | good | good | good | good | good |
| Resistance to climate | good | good | good | good | good | good | good | good |
| Resistance to water | good | good | good | good | good | good | good | good |
| Resistance to fouling | ⊙ | ⊙ | ⊙ | ⊙ | ⊙ | ⊙ | ⊙ | ⊙ |
| Transparency | ○ | ○ | ○ | ○ | ○ | ○ | ○ | ○ |

TABLE 21

| Examples | 57 | 58 | 59 | 60 | 61 | 62 | 63 | 64 |
|---|---|---|---|---|---|---|---|---|
| Undercoating | ii-6 | ii-6 | ii-6 | ii-6 | ii-7 | ii-7 | ii-7 | ii-7 |
| Overcoating | I-15 | I-16 | I-17 | I-18 | I-10 | I-11 | I-13 | I-15 |
| Adhesion (piece/100) | 100 | 100 | 100 | 100 | 100 | 100 | 100 | 100 |
| Pencil hardness | 4H | 4H | 4H | 4H | 4H | 4H | 4H | 4H |
| Resistance to alkalis | good | good | good | good | good | good | good | good |
| Resistance to chemicals | good | good | good | good | good | good | good | good |
| Resistance to moisture | good | good | good | good | good | good | good | good |
| Resistance to climate | good | good | good | good | good | good | good | good |
| Resistance to water | good | good | good | good | good | good | good | good |
| Resistance to fouling | ⊙ | ⊙ | ⊙ | ⊙ | ⊙ | ⊙ | ⊙ | ⊙ |
| Transparency | ○ | ○ | ○ | ○ | ○ | ○ | ○ | ○ |

TABLE 22

| Examples | 65 | 66 | 67 | 68 | 69 | 70 | 71 | 72 |
|---|---|---|---|---|---|---|---|---|
| Undercoating | ii-7 | ii-7 | ii-7 | ii-7 | ii-8 | ii-8 | ii-8 | ii-8 |
| Overcoating | I-16 | I-17 | I-18 | I-20 | I-10 | I-15 | I-18 | I-21 |
| Adhesion (piece/100) | 100 | 100 | 100 | 100 | 100 | 100 | 100 | 100 |
| Pencil hardness | 4H | 4H | 4H | 4H | 4H | 4H | 4H | 4H |
| Resistance to alkalis | good | good | good | good | good | good | good | good |
| Resistance to chemicals | good | good | good | good | good | good | good | good |
| Resistance to moisture | good | good | good | good | good | good | good | good |
| Resistance to climate | good | good | good | good | good | good | good | good |
| Resistance to water | good | good | good | good | good | good | good | good |
| Resistance to fouling | ⊙ | ⊙ | ⊙ | ⊙ | ⊙ | ⊙ | ⊙ | ⊙ |
| Transparency | ○ | ○ | ○ | ○ | ○ | ○ | ○ | ○ |

TABLE 23

| Examples | 73 | 74 | 75 | 76 | 77 | 78 | 79 | 80 |
|---|---|---|---|---|---|---|---|---|
| Undercoating | ii-9 | ii-9 | ii-9 | ii-9 | ii-9 | ii-9 | ii-9 | ii-9 |
| Overcoating | I-10 | I-13 | I-14 | I-15 | I-17 | I-18 | I-19 | I-21 |
| Adhesion (piece/100) | 100 | 100 | 100 | 100 | 100 | 100 | 100 | 100 |
| Pencil hardness | 4H | 4H | 4H | 4H | 4H | 4H | 4H | 4H |
| Resistance to alkalis | good | good | good | good | good | good | good | good |
| Resistance to chemicals | good | good | good | good | good | good | good | good |
| Resistance to moisture | good | good | good | good | good | good | good | good |
| Resistance to climate | good | good | good | good | good | good | good | good |
| Resistance to water | good | good | good | good | good | good | good | good |
| Resistance to fouling | ⊙ | ⊙ | ⊙ | ⊙ | ⊙ | ⊙ | ⊙ | ⊙ |
| Transparency | ○ | ○ | ○ | ○ | ○ | ○ | ○ | ○ |

TABLE 24

| Examples | 81 | 82 | 83 | 84 | 85 | 86 | 87 | 88 |
|---|---|---|---|---|---|---|---|---|
| Undercoating | ii-4 | ii-4 | ii-4 | ii-4 | ii-4 | ii-4 | ii-4 | ii-5 |
| Overcoating | II-19 | II-20 | II-21 | II-22 | II-23 | II-24 | II-25 | II-19 |
| Adhesion (piece/100) | 100 | 100 | 100 | 100 | 100 | 100 | 100 | 100 |
| Pencil hardness | 3H | 3H | 3H | 3H | 2H | 3H | 3H | 3H |
| Resistance to alkalis | good | good | good | good | good | good | good | good |
| Resistance to chemicals | good | good | good | good | good | good | good | good |
| Resistance to moisture | good | good | good | good | good | good | good | good |
| Resistance to climate | good | good | good | good | good | good | good | good |
| Resistance to water | good | good | good | good | good | good | good | good |
| Resistance to fouling | ⊙ | ⊙ | ⊙ | ⊙ | ⊙ | ⊙ | ⊙ | ⊙ |
| Transparency | ○ | ○ | ○ | ○ | ○ | ○ | ○ | ○ |

TABLE 25

| Examples | 89 | 90 | 92 | 92 | 93 | 94 | 95 | 96 |
|---|---|---|---|---|---|---|---|---|
| Undercoating | ii-5 | ii-6 | ii-6 | ii-6 | ii-6 | ii-6 | ii-7 | ii-7 |
| Overcoating | II-24 | II-19 | II-20 | II-21 | II-24 | II-25 | II-19 | II-24 |
| Adhesion (piece/100) | 100 | 100 | 100 | 100 | 100 | 100 | 100 | 100 |
| Pencil hardness | 2H | 3H | 3H | 3H | 3H | 2H | 3H | 3H |
| Resistance to alkalis | good | good | good | good | good | good | good | good |
| Resistance to chemicals | good | good | good | good | good | good | good | good |
| Resistance to moisture | good | good | good | good | good | good | good | good |
| Resistance to climate | good | good | good | good | good | good | good | good |
| Resistance to water | good | good | good | good | good | good | good | good |
| Resistance to fouling | ⊚ | ⊚ | ⊚ | ⊚ | ⊚ | ⊚ | ⊚ | ⊚ |
| Transparency | ○ | ○ | ○ | ○ | ○ | ○ | ○ | ○ |

TABLE 26

| Examples | 97 | 98 | 99 | 100 |
|---|---|---|---|---|
| Undercoating | ii-7 | ii-8 | ii-9 | ii-9 |
| Overcoating | II-25 | II-19 | II-19 | II-24 |
| Adhesion (piece/100) | 100 | 100 | 100 | 100 |
| Pencil hardness | 2H | 3H | 3H | 3H |
| Resistance to alkalis | good | good | good | good |
| Resistance to chemicals | good | good | good | good |
| Resistance to moisture | good | good | good | good |
| Resistance to climate | good | good | good | good |
| Resistance to water | good | good | good | good |
| Resistance to fouling | ⊚ | ⊚ | ⊚ | ⊚ |
| Transparency | ○ | ○ | ○ | ○ |

EXAMPLES 101 TO 120

Each of the undercoating compositions was applied to the corresponding substrate listed in Table 27 and dried. Then, a corresponding type of the overcoating composition was applied to the undercoating and dried for curing. A resultant coating film was analyzed for the adhesion and the resistance to climate. The result of the analysis is shown in Table 27.

TABLE 27

| | Substrate | Undercoat (thickness in μm) | Overcoat (thickness in μm) | Adhesion | Resistance to climate | Resistance to fouling |
|---|---|---|---|---|---|---|
| Examples | | | | | | |
| 101 | Acryl | ii-2(1) | I-1(0.2) | 100 | good | ○ |
| 102 | film | ii-2(1) | II-1(0.2) | 100 | good | ○ |
| 103 | (50 μm | ii-4(1) | I-17(0.1) | 100 | good | ○ |
| 104 | thick) | ii-5(1) | I-17(0.1) | 100 | good | ○ |
| 105 | | ii-9(1) | I-17(0.1) | 100 | good | ○ |
| 106 | | ii-9(1) | I-18(0.1) | 100 | good | ○ |
| 107 | | ii-4(1) | II-19(0.1) | 100 | good | ○ |
| 108 | | ii-5(1) | II-24(0.1) | 100 | good | ○ |
| 109 | | ii-7(1) | II-25(0.1) | 100 | good | ○ |
| 110 | | ii-9(1) | II-25(0.1) | 100 | good | ○ |
| 111 | PC | ii-2(0.5) | I-1(0.2) | 100 | good | ○ |
| 112 | film | ii-2(0.5) | II-1(0.2) | 100 | good | ○ |
| 113 | | ii-4(1) | I-10(0.1) | 100 | good | ○ |
| 114 | | ii-6(1) | I-16(0.1) | 100 | good | ○ |
| 115 | | ii-7(1) | I-17(0.1) | 100 | good | ○ |
| 116 | | ii-9(1) | I-18(0.1) | 100 | good | ○ |
| 117 | | ii-4(1) | II-19(0.1) | 100 | good | ○ |
| 118 | | ii-6(1) | II-25(0.1) | 100 | good | ○ |
| 119 | | ii-7(1) | II-20(0.1) | 100 | good | ○ |
| 120 | | ii-9(1) | II-21(0.1) | 100 | good | ○ |

EFFECT OF THE INVENTION

The composition according to the present invention enables to provide a film which is improved in the resistance to fouling, the durability, and the transparency and has a photocatalytic function. The photocatalyst coating film made of the composition of the present invention can successfully be used preferably as a window film or more particularly as an automobile window film, a structure or house window film, a protective film, an UV barrier film, and an anti-fogging film.

What is claimed is:

1. A method of making photocatalyst contained coating films comprising the steps of providing a coating film of the composition (i) or (ii) on the surface of an organic film and providing a coating film of the composition (I) or (II) on the coating film, wherein:

the composition (i) is a coating composition containing at least one component (a) selected from organosilanes, hydrolyzates of the organosilanes, and condensates of the organosilanes represented by Formula 1

$$(R^1)_n Si(OR^2)_{4-n} \tag{1}$$

(wherein, $R^1$ is a monovalent organic group having 1 to 8 carbon atoms; when two exist, they are either identical to or different from each other; $R^2$ is an alkyl group having 1 to 5 carbon atoms or an acyl group having 1 to 6 carbon atoms: when two exist, they are either identical to or different from each other; and n is an integer ranging from 0 to 2);

the composition (ii) is a coating composition containing the component (a) and a polymer component (b) having a silyl group having silicon atoms bonded with a hydrolytic group and/or a hydroxy group;

the composition (I) is a coating composition containing the component (a) and a photocatalyst (c); and the composition (II) is a coating composition containing the component (a), the polymer component (b), and the photocatalyst (c).

2. A method of making photocatalyst contained coating films according to claim 1, wherein the component (b) in the composition (ii) is at least a substance selected from polymers having a structural unit expressed by Formula 2

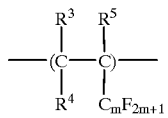

(2)

(wherein, $R^3$ to $R^5$ are $C_m Y_{2m+1}$, m is an integer ranging from 0 to 5, and Y is selected from F, H, and Cl separately) and/or a structural unit expressed by Formula (3)

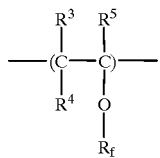

(3)

(wherein, $R_f$ is an alkyl group or an alkoxyalkyl group having fluorine atoms and $R^3$ to $R^5$ are as defined in Formula 2), and simultaneously having a silyl group having silicon atoms bonded with a hydrolytic group and/or a hydroxy group.

3. A method of making photocatalyst contained coating films according to claim 1, wherein the component (b) in the composition (II) is at least a substance selected from polymers having a structural unit expressed by Formula 2 and/or a structural unit expressed by Formula 3 and simultaneously having a silyl group containing silicon atoms bonded with a hydrolytic group and/or a hydroxy group.

4. A method of making photocatalyst contained coating films according to claim 1, wherein the composition (i) or (ii) further contains an ultraviolet light absorber (d).

5. A method of making photocatalyst contained coating films according to claim 1, wherein the composition (I) or (II) further contains a colloidal silica and/or a colloidal alumina (e).

6. A method of making photocatalyst contained coating films according to claim 1, wherein the composition (i) or (ii) further contains a colloidal silica and/or a colloidal alumina (e).

7. A method of making photocatalyst contained coating films according to claim 1, wherein the component (a) in at least one of the compositions (i), (ii), (I), and (II) has partially or at its entirety an SiO bond and a siloxane oligomer of which the weight average molecular weight ranges from 300 to 100,000.

8. A method of making photocatalyst contained coating films according to claim 1, wherein at least one of the compositions (i), (ii), (I), and (II) has a curing catalyst.

9. A method of making photocatalyst contained coating films according to claim 7, wherein the curing catalyst (f) is an organic metal compound.

10. A method of making photocatalyst contained coating films according to claim 1, wherein at least one of the compositions (i), (ii), (I), and (II) contains at least a compound selected from β-diketones and β-ketoesters (g) expressed by Formula 4

$$R^6 COCH_2 COR^7 \tag{4}$$

(wherein, $R^6$ is a monovalent hydrocarbon group having 1 to 6 carbon atoms, and $R^7$ is either a monovalent hydrocarbon group having 1 to 6 carbon atoms, or an alkoxy group having 1 to 16 carbon atoms).

11. A photocatalyst coating film produced by any of claims 1 to 10.

12. A method of making photocatalyst contained coating films according to claim 1, wherein the organic film is selected from the group consisting of polyesters, polyamides, polyolefins, polyacryls, polycarbonates, or a fluorine-containing polymer.

13. A photocatalyst coating film produced by claim 12.

14. A method of making photocatalyst contained coating films according to claim 10, wherein $R^6$ is methyl, ethyl, n-propyl, i-propyl, n-butyl, sec-butyl, t-butyl, n-pentyl, n-hexyl, cyclohexyl, or phenyl, and $R^7$ is methyl, ethyl, n-propyl, i-propyl, n-butyl, sec-butyl, t-butyl, n-pentyl, n-hexyl, cyclohexyl, phenyl, methoxy, ethoxy, n-propoxy, i-propoxy, n-butoxy, sec-butoxy, t-butoxy, lauryloxy, or stearyloxy.

* * * * *